(12) United States Patent  (10) Patent No.: US 12,143,927 B2
Hu et al.                  (45) Date of Patent:     Nov. 12, 2024

(54) NETWORK SLICE SHARING OF RESOURCE OBJECTS

(71) Applicant: Huawei Technologies Co., Ltd., Shenzhen (CN)

(72) Inventors: Zhibo Hu, Beijing (CN); Junda Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 635 days.

(21) Appl. No.: 17/334,127

(22) Filed: May 28, 2021

(65) Prior Publication Data

US 2021/0289436 A1    Sep. 16, 2021

Related U.S. Application Data

(63) Continuation of application No. PCT/CN2019/121834, filed on Nov. 29, 2019.

(30) Foreign Application Priority Data

Nov. 30, 2018    (CN) .......................... 201811455908.6

(51) Int. Cl.
*H04W 48/18* (2009.01)
*H04W 24/02* (2009.01)
(Continued)

(52) U.S. Cl.
CPC .......... *H04W 48/18* (2013.01); *H04W 24/02* (2013.01); *H04W 28/0273* (2013.01); *H04W 28/04* (2013.01); *H04W 28/16* (2013.01)

(58) Field of Classification Search
CPC . H04W 48/18; H04W 24/02; H04W 28/0273; H04W 28/04; H04W 28/16;
(Continued)

(56) References Cited

U.S. PATENT DOCUMENTS 10,750,351 B1 * 8/2020 Paczkowski ........ H04L 12/4625
2017/0054595 A1    2/2017 Zhang et al.
(Continued)

FOREIGN PATENT DOCUMENTS

CN    107071782 A    8/2017
CN    107317712 A    11/2017
(Continued)

OTHER PUBLICATIONS

Nakao, A., et al., "Baseline Document: Application of network softwarization to IMT-2020; IMT-O-028," ITU-T Draft; Study Period 2013-2016; Focus Group IMT-2020; SERI ES IMT-O-028, May 17-20, 2016, 57 pages.
(Continued)

*Primary Examiner* — Un C Cho
*Assistant Examiner* — Lalita W Pace
(74) *Attorney, Agent, or Firm* — Conley Rose, P.C.

(57) ABSTRACT

A controller obtains request messages. The controller creates at least two network slices based on the request messages. The at least two network slices include a first network slice and a second network slice. The first network slice and the second network slice share a resource object at each layer in a network slice architecture. The controller sends information including information about the first network slice and information about the second network slice to one or more target forwarding devices. The information about the first network slice indicates a resource object that is at each layer in the network slice architecture and that is associated with the first network slice. The information about the second network slice indicates a resource object that is at each layer in the network slice architecture and that is associated with the second network slice.

34 Claims, 13 Drawing Sheets

(51) Int. Cl.
*H04W 28/02* (2009.01)
*H04W 28/04* (2009.01)
*H04W 28/16* (2009.01)

(58) Field of Classification Search
CPC ...... H04W 88/04; H04W 72/53; H04L 41/40; H04L 41/12; H04L 41/5096; H04L 41/5051; H04L 41/122; H04L 41/34
See application file for complete search history.

(56) References Cited

U.S. PATENT DOCUMENTS

| | | | |
|---|---|---|---|
| 2017/0289791 A1* | 10/2017 | Yoo | H04W 68/005 |
| 2017/0331785 A1* | 11/2017 | Xu | H04W 48/18 |
| 2018/0049015 A1* | 2/2018 | Gupta | H04W 72/04 |
| 2018/0287891 A1* | 10/2018 | Shaw | H04W 24/02 |
| 2018/0376407 A1* | 12/2018 | Myhre | H04W 74/0833 |
| 2019/0124704 A1 | 4/2019 | Sun et al. | |
| 2019/0260690 A1 | 8/2019 | Sun et al. | |
| 2019/0289647 A1 | 9/2019 | Li | |
| 2020/0154280 A1* | 5/2020 | Deviprasad | H04L 41/0806 |
| 2020/0274764 A1* | 8/2020 | Guilbeault | H04L 41/40 |
| 2021/0119912 A1 | 4/2021 | Du et al. | |

FOREIGN PATENT DOCUMENTS

| | | | | |
|---|---|---|---|---|
| CN | 107517488 A | 12/2017 | | |
| CN | 108023757 A | 5/2018 | | |
| CN | 108111931 A | 6/2018 | | |
| WO | 2018006304 A1 | 1/2018 | | |
| WO | WO-2018038487 A1 * | 3/2018 | ........ | H04W 36/0055 |
| WO | 2018089634 A1 | 5/2018 | | |
| WO | 2018112804 A1 | 6/2018 | | |
| WO | 2018113692 A1 | 6/2018 | | |
| WO | WO-2019233420 A1 * | 12/2019 | ......... | H04L 41/0893 |

OTHER PUBLICATIONS

Huawei, "Add use case and requirements for changing topology of a NSSI," S5-171669, Mar. 27-31, 2017, Guilin (China), 2 pages.

Psenak, P., et al., "Multi-Topology (MT) Routing in OSPF," RFC 4915, Jun. 2007, 20 Pages.

Przygienda, T., et al., "M-ISIS: Multi Topology (MT) Routing in; Intermediate System to Intermediate Systems (IS-ISs)," RFC 5120 , Feb. 2008, 14 Pages.

* cited by examiner

NETWORK SLICE SHARING OF RESOURCE OBJECTS

CROSS-REFERENCE TO RELATED APPLICATIONS

This is a continuation of Int'l Patent App. No. PCT/CN2019/121834, filed on Nov. 29, 2019, which claims priority to Chinese Patent App. No. 201811455908.6, filed on Nov. 30, 2018, both of which are incorporated by reference.

FIELD

This disclosure relates to the field of communications technologies, and in particular, to a data processing method, a controller, and a forwarding device.

BACKGROUND

To cope with various existing or future user cases, different user cases have significantly different network performance requirements. For example, a fifth generation (5G) mobile communications system such as New Radio (NR) is significantly featured by a proposed network architecture of a network slice (NS).

Currently, a network slice may be supported by extending a multi-topology (MT) protocol. Each network slice has one MT identifier/id (ID), and each network slice corresponds to one forwarding resource and one independent topology.

However, in a solution of supporting a network slice by extending an MT protocol, a network slice technology is strongly bound to the MT protocol and strongly associated with an MT technology, and consequently it is very limitative.

SUMMARY

Embodiments provide a data processing method, a controller, and a forwarding device, to decouple a network slicing technology from an isolation technology. Therefore, a plurality of network slices can share a resource object at each layer in a network slice architecture, thereby implementing resource sharing and isolation, and improving application flexibility of the network slicing technology.

According to a first aspect, an embodiment provides a data processing method, including:

In a communications system, client devices may request a controller to create network slices. After obtaining network slice request messages sent by the client devices, the controller may create at least two network slices based on the request messages. The at least two network slices include a first network slice and a second network slice. The first network slice and the second network slice share a resource object at each layer in the network slice architecture. Then, the controller may send information about the at least two network slices to one or more target forwarding devices. The information about the at least two network slices may include information about the first network slice and information about the second network slice. The information about the first network slice indicates a resource object that is at each layer in the network slice architecture and that is associated with the first network slice. The information about the second network slice indicates a resource object that is at each layer in the network slice architecture and that is associated with the second network slice. The network slice architecture includes at least one of a management layer, a control resource layer, a service layer, a protocol layer, a network layer, and a forwarding resource layer. Therefore, in this embodiment, network slices may share a resource object at each layer in the network slice architecture, so that a network slicing technology is decoupled from an isolation technology, thereby improving application flexibility of the network slicing technology.

In a possible implementation, the information about the first network slice may include a mapping relationship between the first network slice and a resource object at each layer in the network slice architecture, and the information about the second network slice may include a mapping relationship between the second network slice and a resource object at each layer in the network slice architecture. In this possible implementation, a specific solution of delivering a mapping relationship between a network slice and a resource object at each layer in the network slice architecture to notify a target forwarding device of information about the network slice is provided. This improves practicability of the solution during actual application.

In another possible implementation, the request messages may include a first request message and a second request message. The first request message is a message used by a first client device to request to create the first network slice. The second request message is a message used by a second client device to request to create the second network slice. The first request message includes first protocol requirement information of a first service carried by the first network slice. The second request message includes second protocol requirement information of a second service carried by the second network slice. That the controller creates at least two network slices based on the request messages may include: The controller may associate the first network slice with a first resource object at the protocol layer in the network slice architecture based on the first protocol requirement information. The first resource object at the protocol layer is a first protocol. The controller associates the second network slice with a second resource object at the protocol layer in the network slice architecture based on the second protocol requirement information. The second resource object at the protocol layer is a second protocol. The first protocol is the same as the second protocol. In this possible implementation, the first network slice and the second network slice may share a same protocol at the protocol layer, so as to implement resource object sharing at the protocol layer is shared, thereby improving flexibility of the network slicing technology.

In another possible implementation, the request messages may include a first request message and a second request message. The first request message is a message used by the first client device to request to create the first network slice. The second request message is a message used by a second client device to request to create the second network slice. The first request message may include first protocol requirement information of a first service carried by the first network slice. The second request message may include second protocol requirement information of a second service carried by the second network slice. That the controller creates at least two network slices based on the request messages may include: The controller may associate the first network slice with a first resource object at the protocol layer in the network slice architecture based on the first protocol requirement information, and associate the second network slice with a second resource object at the protocol layer in the network slice architecture based on the second protocol requirement information. The first resource object at the protocol layer is a first protocol. The second resource object at the protocol layer is a second protocol. The first protocol is different from the second protocol. In this possible implementation, the first network slice and the second network slice are associated with different resource objects at the protocol layer. Therefore, the technical solution can implement isolation of resources used by network slices.

In another possible implementation, the first request message may further include information about a first network access point accessed by the first client device, and the second request message may further include information about a second network access point accessed by the second client device. That the controller creates at least two network slices based on the request messages may include: The controller may associate the first network slice with a first resource object at the network layer in the network slice architecture based on the information about the first network access point, and associate the second network slice with a second resource object at the network layer in the network slice architecture based on the information about the second network access point. The first resource object at the network layer is a first network topology. The second resource object at the network layer is a second network topology. The first network topology is the same as the second network topology. In this possible implementation, the first network slice and the second network slice may share a same network topology at the network layer, so as to implement resource object sharing at the network layer, thereby improving flexibility of the network slicing technology and practicability of the solution.

In another possible implementation, the first request message may further include information about a first network access point accessed by the first client device, and the second request message may further include information about a second network access point accessed by the second client device. That the controller creates at least two network slices based on the request messages may include: The controller may associate the first network slice with a first resource object at the network layer in the network slice architecture based on the information about the first network access point, and associate the second network slice with a second resource object at the network layer in the network slice architecture based on the information about the second network access point. The first resource object at the network layer is a first network topology. The second resource object at the network layer is a second network topology. The first network topology is different from the second network topology. In this possible implementation, the first network slice and the second network slice are associated with different network topologies at the network layer. Therefore, the technical solution can implement isolation of resources used by network slices.

In another possible implementation, that the controller associates the first network slice with a first resource object at the network layer in the network slice architecture based on the information about the first network access point may include: The controller first uses location information of the first network access point as a path parameter; then obtains, through calculation based on the path parameter and a preset algorithm, the first network topology corresponding to the first network slice; and associates the first network slice with the first network topology. In this possible implementation, a specific implementation in which the controller associates the first network slice with the first network topology based on the information about the first network access point is provided. This improves realizability and practicability of the solution during actual application.

In another possible implementation, the first request message may further include first quality of service requirement information corresponding to the first service, and the second request message may further include second quality of service requirement information corresponding to the second service. That the controller creates at least two network slices based on the request messages may include: The controller may allocate a first resource object at the forwarding resource layer in the network slice architecture to the first network slice based on the first quality of service requirement information, and allocate a second resource object at the forwarding resource layer in the network slice architecture to the second network slice based on the second quality of service requirement information. The first resource object at the forwarding resource layer is a first forwarding resource. The second resource object at the forwarding resource layer is a second forwarding resource. The first forwarding resource is the same as the second forwarding resource. The first forwarding resource includes at least one of a sub-interface and traffic of a forwarding device. In this possible implementation, the first network slice and the second network slice may share a forwarding resource at the forwarding resource layer, so as to implement resource sharing, thereby improving flexibility of the network slicing technology and practicability and diversity of the solution.

In another possible implementation, the first request message may further include first quality of service requirement information corresponding to the first service, and the second request message may further include the second quality of service requirement information corresponding to the second service. That the controller creates at least two network slices based on the request messages may include: The controller may allocate a first resource object at the forwarding resource layer in the network slice architecture to the first network slice based on the first quality of service requirement information, and allocate a second resource object at the forwarding resource layer in the network slice architecture to the second network slice based on the second quality of service requirement information. The first resource object at the forwarding resource layer is a first forwarding resource. The second resource object at the forwarding resource layer is a second forwarding resource. The first forwarding resource is different from the second forwarding resource. The first forwarding resource includes at least one of a sub-interface and traffic of a forwarding device. In this possible implementation, the first network slice and the second network slice use different forwarding resources at the forwarding resource layer, so as to implement forwarding resource isolation.

In another possible implementation, the first quality of service requirement information includes latency information of the first service and bandwidth requirement information of the first service. That the controller allocates a first resource object at the forwarding resource layer in the network slice architecture to the first network slice based on the first quality of service requirement information may include: The controller may calculate, based on the latency information, the bandwidth requirement information, and a preset algorithm, the first forwarding resource corresponding to the first network slice. Then, the controller associates the first network slice with the first forwarding resource at the forwarding resource layer in the network slice architecture. In this possible implementation, a specific implementation in which the controller associates the first network slice with the first forwarding resource based on the first quality of service requirement information is provided. This improves realizability of the solution during actual application.

In another possible implementation, the first request message may further include first management requirement information corresponding to the first network slice, and the second request message may further include second management requirement information corresponding to the second network slice. That the controller creates at least two network slices based on the request messages may include: The controller may associate the first network slice with a first resource object at the management layer in the network slice architecture based on the first management requirement information, and associate the second network slice with the first resource object at the management layer in the network slice architecture based on the second management requirement information. The first resource object at the management layer is a first management resource. The first management resource is associated with a first management address. The first management address is used by the first client device to access running data and management data of the first network slice in the first management resource, and the first management address is used by the second client device to access running data and management data of the second network slice in the first management resource. The first management resource includes at least one of a management protocol and a management language. In this possible implementation, the first network slice and the second network slice share a same management resource at the management layer, so as to implement management resource sharing at the management layer, thereby improving practicability and diversity of the solution.

In another possible implementation, the first request message may further include first management requirement information corresponding to the first network slice, and the second request message may further include second management requirement information corresponding to the second network slice. That the controller creates at least two network slices based on the request messages may include: The controller associates the first network slice with a first resource object at the management layer in the network slice architecture based on the first management requirement information, and associates the second network slice with a second resource object at the management layer in the network slice architecture based on the second management requirement information. The first resource object at the management layer is a first management resource. The second resource object at the management layer is a second management resource. The first management resource is associated with the first management address. The first management address is used by the first client device to access running data and management data in the first management resource corresponding to the first network slice. The second management resource is associated with the second management address. The second management address is used by the second client device to access running data and management data of the second network slice in the second management resource. The first management address includes at least one of a management protocol and a management language. In this possible implementation, the first network slice and the second network slice are associated with different management resources at the management layer, so as to implement resource isolation between network slices at the management layer, thereby improving diversity and completeness of the solution.

In another possible implementation, the first management requirement information carries a management identifier, and the management identifier indicates a requirement of the first client device for managing data of the first network slice at each layer in the network slice architecture. That the controller associates the first network slice with a first resource object at the management layer in the network slice architecture based on the first management requirement information includes: The controller determines, based on the management identifier, that the first network slice corresponds to the first management resource at the management layer. The controller associates the first network slice with the first management resource.

In another possible implementation, the first request message may further include first routing requirement information, and the second request message may further include second routing requirement information. That the controller creates at least two network slices based on the request messages may include: The controller may associate the first network slice with a first resource object at the control resource layer in the network slice architecture based on the first routing requirement information, and associate the second network slice with a second resource object at the control resource layer in the network slice architecture based on the second routing requirement information. The first resource object at the control resource layer is a first system resource. The second resource object at the control resource layer is a second system resource. The first system resource is the same as the second system resource. The first system resource includes a port, a central processing unit (CPU), and a memory of the first forwarding device. In this possible implementation, the first network slice and the second network slice may share a system resource at the control resource layer, so as to implement system resource sharing at the control resource layer, thereby improving diversity and practicability of the solution during actual application.

In another possible implementation, the first request message may further include first routing requirement information, and the second request message may further include second routing requirement information. That the controller creates at least two network slices based on the request messages may include: The controller may associate the first network slice with a first resource object at the control resource layer in the network slice architecture based on the first routing requirement information, and associate the second network slice with a second resource object at the control resource layer in the network slice architecture based on the second routing requirement information. The first resource object at the control resource layer is a first system resource. The second resource object at the control resource layer is a second system resource. The first system resource is different from the second system resource. The first system resource includes a port, a CPU, and a memory of the first forwarding device. In this possible implementation, the first network slice and the second network slice use different system resources at the control resource layer, so as to implement system resource isolation between network slices at the control resource layer, thereby improving practicability and diversity of the solution.

In another possible implementation, the first routing requirement information may include a quantity of routes of a private network in which the first client device is located. That the controller associates the first network slice with a first resource object at the control resource layer in the network slice architecture based on the first routing requirement information may include: The controller may determine, based on the quantity of private network routes, to allocate the first resource object at the control resource layer in the network slice architecture to the first network slice.

The first resource object at the control resource layer includes the first system resource. Then, the controller associates the first network slice with the first resource object at the control resource layer. In this possible implementation, a specific implementation in which the controller associates the first network slice with the first resource object at the control resource layer based on the first routing requirement information is provided, thereby improving realizability and practicability of the solution.

In another possible implementation, the first request message further carries first tenant information, and the second request message further carries second tenant information. That the controller creates at least two network slices based on the request messages may include: The controller may associate the first network slice with a first resource object at the service layer in the network slice architecture based on the first tenant information, and associate the second network slice with a second resource object at the service layer in the network slice architecture based on the second tenant information. The first resource object at the service layer is a first virtual private network (VPN). The second resource object at the service layer is a second VPN. The first VPN is the same as the second VPN. In this possible implementation, the first network slice and the second network slice may share a resource object at the service layer in the network slice architecture, so as to implement resource object sharing at the service layer, thereby improving practicability of the solution during actual application.

In another possible implementation, the first request message further carries first tenant information, and the second request message further carries second tenant information. That the controller creates at least two network slices based on the request messages may include: The controller may associate the first network slice with a first resource object at the service layer in the network slice architecture based on the first tenant information, and associate the second network slice with a second resource object at the service layer in the network slice architecture based on the second tenant information. The first resource object at the service layer is a first VPN. The second resource object at the service layer is a second VPN. The first VPN is different from the second VPN. In this possible implementation, the first network slice and the second network slice separately use different VPNs at the service layer, so as to support services of network slices and implement resource isolation at the service layer, thereby improving realizability and practicability of the solution during actual application.

According to a second aspect, an embodiment provides a data processing method, including:

In a communications system, a client device transmits service data. Therefore, a first forwarding device may obtain a first data packet and a second data packet. The first data packet is associated with a first network slice. The second data packet is associated with a second network slice. The first network slice and the second network slice share a resource object at each layer in a network slice architecture. The network slice architecture includes at least one of a management layer, a control resource layer, a service layer, a protocol layer, a network layer, and a forwarding resource layer. The first forwarding device may obtain information about the first network slice and information about the second network slice. The information about the first network slice indicates a resource object that is at each layer in the network slice architecture and that is associated with the first network slice. The information about the second network slice indicates a resource object that is at each layer in the network slice architecture and that is associated with the second network slice. Then, the first forwarding device may determine, based on the information about the first network slice, a resource used to forward the first data packet, and determine, based on the information about the second network slice, a resource used to forward the second data packet.

In this embodiment, the first network slice and the second network slice share the resource object at each layer in the network slice architecture, so as to implement resource object sharing and isolation at each layer in the network slice architecture. A forwarding device may determine, based on the information about the first network slice, the resource used to forward the first data packet, and determine, based on the information about the second network slice, the resource used to forward the second data packet.

In a possible implementation, that the first forwarding device obtains information about the first network slice and information about the second network slice includes: The first forwarding device receives the information about the first network slice and the information about the second network slice that are sent by a controller. In this possible implementation, information about a network slice may be delivered by the controller to a forwarding device.

In another possible implementation, the first data packet and the second data packet have a same destination address. That the first forwarding device determines, based on the information about the first network slice, a resource used to forward the first data packet, and determines, based on the information about the second network slice, a resource used to forward the second data packet may include: The first forwarding device may determine, based on a resource object that is at the network layer in the network slice architecture and that is associated with the first network slice, that the first network slice is associated with a first network topology, and determine, based on a resource object that is at the network layer in the network slice architecture and that is associated with the second network slice, that the second network slice is associated with the first network topology. Then, the first forwarding device may determine, based on a resource object that is at the forwarding resource layer in the network slice architecture and that is associated with the first network slice, that the first network slice is associated with a first forwarding resource, and determine, based on a resource object that is at the forwarding resource layer in the network slice architecture and that is associated with the second network slice, that the second network slice is associated with a second forwarding resource. The method may further include: The first forwarding device may forward the first data packet based on the first network topology and the first forwarding resource, and forward the second data packet based on the first network topology and the second forwarding resource. In this possible implementation, the forwarding device determines, based on the information about the network slice, a resource correspondingly used to forward a data packet. During actual application, a specific implementation in which a forwarding device determines a resource used to forward a data packet is provided, and then the data packet is forwarded by using the resource. This improves realizability and practicability of the solution.

In another possible implementation, that the first forwarding device forwards the first data packet based on the first network topology and the first forwarding resource may include: The first forwarding device may first calculate a first forwarding path based on the first network topology and the destination address. Then, the first forwarding device may determine a second forwarding device based on the first forwarding path. The second forwarding device is a node device on the first forwarding path. The first forwarding device forwards the first data packet to the second forwarding device by using the first forwarding resource. That the first forwarding device forwards the second data packet based on the first network topology and the second forwarding resource may include: The first forwarding device forwards the second data packet to the second forwarding device by using the second forwarding resource. In this possible implementation, after determining the resource used to forward the first data packet and the resource used to forward the second data packet, the first forwarding device may forward the first data packet and the second data packet by using the corresponding resources. In addition, when the first network slice and the second network slice share a same network topology, and the first data packet and the second data packet have the same destination address, a same forwarding path may be shared, thereby reducing a calculation amount of calculating a forwarding path by the forwarding device.

In another possible implementation, the first forwarding resource includes a first sub-interface of the second forwarding device, and the second forwarding resource includes a second sub-interface of the second forwarding device. That the first forwarding device forwards the first data packet to the second forwarding device by using the first forwarding resource may include: The first forwarding device may forward the first data packet to the first sub-interface of the second forwarding device. That the first forwarding device forwards the second data packet to the second forwarding device by using the second forwarding resource may include: forwarding the second data packet to the second sub-interface of the second forwarding device. In this possible implementation, the first network slice and the second network slice are associated with different sub-interfaces of the second forwarding device, and then data packets are forwarded to corresponding sub-interfaces of the second forwarding device, so as to implement isolation of data of network slices.

In another possible implementation, when a first link that is between a current sub-interface of the first forwarding device and the second sub-interface of the second forwarding device and through which the second data packet passes is faulty, the method may further include: The first forwarding device may first determine a second network topology. The second network topology is a network topology obtained by excluding the first link from the first network topology. Then, the first forwarding device may calculate a second forwarding path of the second data packet based on the second network topology and the destination address. Subsequently, the first forwarding device forwards the second data packet based on the second forwarding path. This possible implementation provides a solution: When the first link that is between the current sub-interface of the first forwarding device and the second sub-interface of the second forwarding device and through which the second data packet passes is faulty, the first forwarding device recalculates a forwarding path for the second data packet, and forwards the second data packet. This improves practicability and completeness of the solution during actual application.

In another possible implementation, when a first link that is between a current sub-interface of the first forwarding device and the second sub-interface of the second forwarding device and through which the second data packet passes is faulty, the method may further include: The first forwarding device may determine a backup network slice or a public network slice. The backup network slice is a network slice that is set by the controller to replace the second network slice. The public network slice is a network slice that is set by the controller replace the plurality of network slices. The plurality of network slices include the second network slice. The first forwarding device may obtain information about the backup network slice or information about the public network slice. Then, the first forwarding device determines, based on the information about the backup network slice, that the backup network slice is associated with a second network topology, or the first forwarding device determines, based on the information about the public network slice, that the public network slice is associated with a second network topology. Subsequently, the first forwarding device calculates a second forwarding path based on the second network topology and the destination address, and then forwards the second data packet based on the second forwarding path. This possible implementation provides another solution: When the first link that is between the current sub-interface of the first forwarding device and the second sub-interface of the second forwarding device and through which the second data packet passes is faulty, the first forwarding device re-determines a network slice, recalculates the forwarding path for the second data packet, and forwards the second data packet. This improves diversity and practicability of the solution during actual application.

In another possible implementation, the method may further include: The first forwarding device determines, based on a resource object that is at the management layer in the network slice architecture and that is associated with the first network slice, that the first network slice is associated with a first resource object at the management layer, and determines, based on a resource object that is at the management layer in the network slice architecture and that is associated with the second network slice, that the second network slice is associated with the first resource object at the management layer. The first resource object at the management layer is a first management resource. The first management resource is associated with a first management address. The first management address is used by the first client device to access running data and management data of the first network slice in the first management resource corresponding to the first network slice, and the first management address is used by the second client device to access running data and management data of the second network slice in the first management resource. The first management resource includes at least one of a management protocol and a management language. In this possible implementation, the first network slice and the second network slice share a same resource object at the management layer, so as to implement resource object sharing at the management layer. Therefore, management resource sharing can be implemented, and there is no need to define a separate object for each network slice, thereby saving resources at each layer, and improving diversity and practicability of the solution.

In another possible implementation, the method may further include: The first forwarding device determines, based on a resource object that is at the management layer in the network slice architecture and that is associated with the first network slice, that the first network slice is associated with a first resource object at the management layer, and determines, based on a resource object that is at the management layer and that is associated with the second network slice, that the second network slice is associated with a second resource object at the management layer. The first resource object at the management layer is a first management resource. The second resource object at the management layer is a second management resource. The first management resource is different from the second management resource. The first management resource is associated with a first management address. The first management address is used by a first client device to access running data and management data of the first network slice in the first management resource. The second management resource is associated with a second management address. The second management address is used by a second client device to access running data and management data of the second network slice in the second management resource. In this possible implementation, the first network slice and the second network slice use different management resources at the management layer, so as to implement management resource isolation at the management layer, thereby improving practicability during actual application.

In another possible implementation, the method may further include: The first forwarding device may determine, based on a resource object that is at the control resource layer in the network slice architecture and that is associated with the first network slice, that the first network slice is associated with a first resource object at the control resource layer in the network slice architecture, and determine, based on a resource object that is at the control resource layer in the network slice architecture and that is associated with the second network slice, that the second network slice is associated with the first resource object at the control resource layer in the network slice architecture. The first resource object at the control resource layer is a first system resource. The first system resource includes a port, a central processing unit CPU, and a memory of the first forwarding device. The first forwarding device forwards the first data packet and the second data packet by using the first system resource. In this possible implementation, the first network slice and the second network slice may share a resource object at the control resource layer. Therefore, system resource sharing can be implemented, and there is no need to define a separate object for each network slice, thereby saving resources at each layer, and improving practicability of the solution.

In another possible implementation, the method may further include: The first forwarding device may determine, based on a resource object that is at the control resource layer in the network slice architecture and that is associated with the first network slice, that the first network slice is associated with a first resource object at the control resource layer in the network slice architecture, and determine, based on a resource object that is at the control resource layer in the network slice architecture and that is associated with the second network slice, that the second network slice is associated with a second resource object at the control resource layer in the network slice architecture. The first resource object at the control resource layer is a first system resource. The second resource object at the control resource layer is a second system resource. The first system resource is different from the second system resource. The first system resource includes a first port, a first central processing unit CPU, and a first memory of the first forwarding device, and the second system resource includes a second port, a second CPU, and a second memory of the first forwarding device. The first forwarding device forwards the first data packet by using the first system resource, and forwards the second data packet by using the second system resource. In this possible implementation, the first network slice and the second network slice separately use different resource objects at the control resource layer, so as to implement isolation of system resources used by network slices, thereby improving application flexibility of the network slicing technology.

In another possible implementation, the method may further include: The first forwarding device may determine, based on a resource object that is at the service layer in the network slice architecture and that is associated with the first network slice, that the first network slice is associated with a first resource object at the service layer in the network slice architecture, and determine, based on a resource object that is at the service layer in the network slice architecture and that is associated with the second network slice, that the second network slice is associated with the first resource object at the service layer in the network slice architecture. The first resource object at the service layer is a first VPN. The first forwarding device forwards the first data packet and the second data packet through the first VPN. In this possible implementation, the first network slice and the second network slice may share a same resource object at the service layer, so as to implement resource sharing at the service layer, thereby improving practicability of the network slicing technology. Therefore, resource sharing can be implemented, and there is no need to define a separate object for each network slice, thereby saving resources at each layer.

In another possible implementation, the method may further include: The first forwarding device may determine, based on a resource object that is at the service layer in the network slice architecture and that is associated with the first network slice, that the first network slice is associated with a first resource object at the service layer in the network slice architecture, and determine, based on a resource object that is at the service layer in the network slice architecture and that is associated with the second network slice, that the second network slice is associated with a second resource object at the service layer in the network slice architecture. The first resource object at the service layer is a first VPN. The second resource object at the service layer is a second VPN. The first VPN is different from the second VPN. The first forwarding device forwards the first data packet through the first VPN, and forwards the second data packet through the second VPN. In this possible implementation, the first network slice is associated with the first VPN at the service layer, and the second network slice is associated with the second VPN at the service layer, so as to support services carried by network slices and implement isolation of resources used by the network slices at the service layer, thereby improving practicability and diversity of the solution.

In another possible implementation, the method further includes: The first forwarding device determines, based on a resource object that is at the protocol layer in the network slice architecture and that is associated with the first network slice, that the first network slice is associated with a first resource object at the protocol layer in the network slice architecture, and determines, based on a resource object that is at the protocol layer in the network slice architecture and that is associated with the second network slice, that the second network slice is associated with the first resource object at the protocol layer in the network slice architecture. The first resource object at the protocol layer is a first protocol. The first forwarding device performs route learning according to the first protocol, and forwards the first data packet and the second data packet. In this possible implementation, the first network slice and the second network slice share a same resource object at the protocol layer, so as to implement resource sharing at the protocol layer, thereby improving practicability of the network slicing technology. Therefore, resource sharing can be implemented, and there is no need to define a separate object for each network slice, thereby saving resources at each layer.

In another possible implementation, the method further includes: The first forwarding device determines, based on a resource object that is at the protocol layer in the network slice architecture and that is associated with the first network slice, that the first network slice is associated with a first resource object at the protocol layer in the network slice architecture, and determines, based on a resource object that is at the protocol layer in the network slice architecture and that is associated with the second network slice, that the second network slice is associated with a second resource object at the protocol layer in the network slice architecture. The first resource object at the protocol layer is a first protocol. The second resource object at the protocol layer is a second protocol. The first protocol is different from the second protocol. The first forwarding device performs route learning according to the first protocol, and forwards the first data packet. The first forwarding device performs route learning according to the second protocol, and forwards the second data packet. In this possible implementation, the first network slice and the second network slice are separately associated with different protocols at the protocol layer, so that the network slices support different protocols, thereby improving practicability and diversity of the solution.

According to a third aspect, an embodiment provides a controller. The controller has functions of implementing behavior of the controller in the first aspect. The functions may be implemented by hardware, or may be implemented by hardware executing corresponding software. The hardware or the software includes one or more modules corresponding to the functions.

According to a fourth aspect, an embodiment provides a forwarding device. The forwarding device has functions of implementing behavior of the forwarding device in the second aspect. The functions may be implemented by hardware, or may be implemented by hardware executing corresponding software. The hardware or the software includes one or more modules corresponding to the functions.

According to a fifth aspect, an embodiment provides a controller. The controller includes a processor, a memory, an input/output device, and a bus. The processor, the memory, and the input/output device are separately connected to the bus. The memory stores a computer instruction. The processor executes the computer instruction in the memory, to implement any implementation of the first aspect.

According to a sixth aspect, an embodiment provides a forwarding device. The forwarding device includes a processor, a memory, an input/output device, and a bus. The processor, the memory, and the input/output device are separately connected to the bus. The memory stores a computer instruction. The processor executes the computer instruction in the memory, to implement any implementation of the second aspect.

According to a seventh aspect, an embodiment provides a chip system. The chip system includes a processor configured to support a network device in implementing a function in the first aspect, for example, sending or processing data and/or information in the foregoing method. In a possible design, the chip system further includes a memory. The memory is configured to store a program instruction and data that are necessary for the network device. The chip system may include a chip, or may include a chip and another discrete component.

According to an eighth aspect, an embodiment provides a chip system. The chip system includes a processor configured to support a network device in implementing a function in the second aspect, for example, sending or processing data and/or information in the foregoing method. In a possible design, the chip system further includes a memory. The memory is configured to store a program instruction and data that are necessary for the network device. The chip system may include a chip, or may include a chip and another discrete component.

According to a ninth aspect, an embodiment provides a computer program product including an instruction. When the instruction is run on a computer, the computer is enabled to perform any implementation of the first aspect or the second aspect.

According to a tenth aspect, an embodiment provides a computer-readable storage medium including an instruction. When the instruction is run on a computer, the computer is enabled to perform any implementation of the first aspect or the second aspect.

According to an eleventh aspect, an embodiment provides a data processing system, including the controller and the client device in the third aspect and the forwarding device in the fourth aspect.

It can be learned from the foregoing technical solutions that the embodiments have the following advantages:

It can be learned from the foregoing technical solutions that the controller obtains the request messages. The request messages are messages used by client devices to request to create network slices. The controller creates the at least two network slices based on the request messages. The at least two network slices include the first network slice and the second network slice. The first network slice and the second network slice share the resource object at each layer in the network slice architecture. Then, the controller sends the information about the at least two network slices to the one or more target forwarding devices. The information about the at least two network slices includes the information about the first network slice and the information about the second network slice. The information about the first network slice indicates the resource object that is at each layer in the network slice architecture and that is associated with the first network slice. The information about the second network slice indicates the resource object that is at each layer in the network slice architecture and that is associated with the second network slice. The network slice architecture includes at least one of the management layer, the control resource layer, the service layer, the protocol layer, the network layer, and the forwarding resource layer. Therefore, according to the technical solutions, network slices can share a resource object at each layer in the network slice architecture, so that the network slicing technology is decoupled from the isolation technology, thereby improving application flexibility of the network slicing technology.

DETAILED DESCRIPTION

The embodiments provide a data processing method, a controller, and a forwarding device, to decouple a network slicing technology from an isolation technology, so that network slices can share a resource object at each layer in a network slice architecture, thereby implementing resource sharing and isolation, and improving application flexibility of the network slicing technology.

Figure 1A:
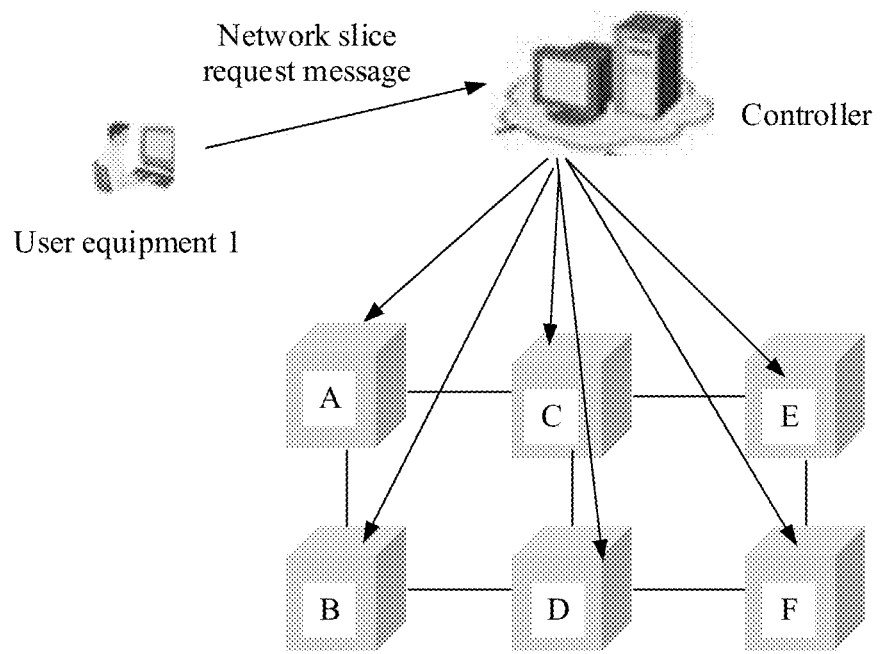
FIG. 1A is a schematic framework diagram of a data processing method according to an embodiment.

In the embodiments, a client device may send a request message for creating a network slice to a controller. Then, the controller may create the network slice based on the request message sent by the client device, and deliver information about the network slice to a target forwarding device. The client device may be a controller of a client, or may be user equipment. This is not specifically limited in this disclosure. The target forwarding device may be a router, a switch, or the like. This is not specifically limited in this disclosure. The following describes the embodiments with reference to the accompanying drawings. Referring to FIG. 1A, an example in which the client device is user equipment 1 is used for description. The controller is configured to: create a network slice based on a network slice request message sent by a user, deliver information about the network slice to the target forwarding device, process a service, and the like. The user equipment 1 may send a request message to the controller. The request message is a request message used by the user equipment 1 to request the controller to create a network slice. The controller may create a network slice based on the request message. The request message carries requirement information of a service required by the user equipment 1. The requirement information of the service may include protocol requirement information, service access point information, quality of service requirement information, management requirement information, routing requirement information, tenant information of a user network, and the like of the service. The controller creates the network slice based on the requirement information of the service, and then delivers information about the network slice to the target forwarding device. The example shown in FIG. 1A is used for description, where A, B, C, D, E and F are forwarding devices. It can be understood that these forwarding devices are network topologies corresponding to network slices that the user equipment 1 requests to create. In this case, these forwarding devices may be understood as target forwarding devices, and the controller delivers the information about the network slices to these forwarding devices.

Figure 1B:
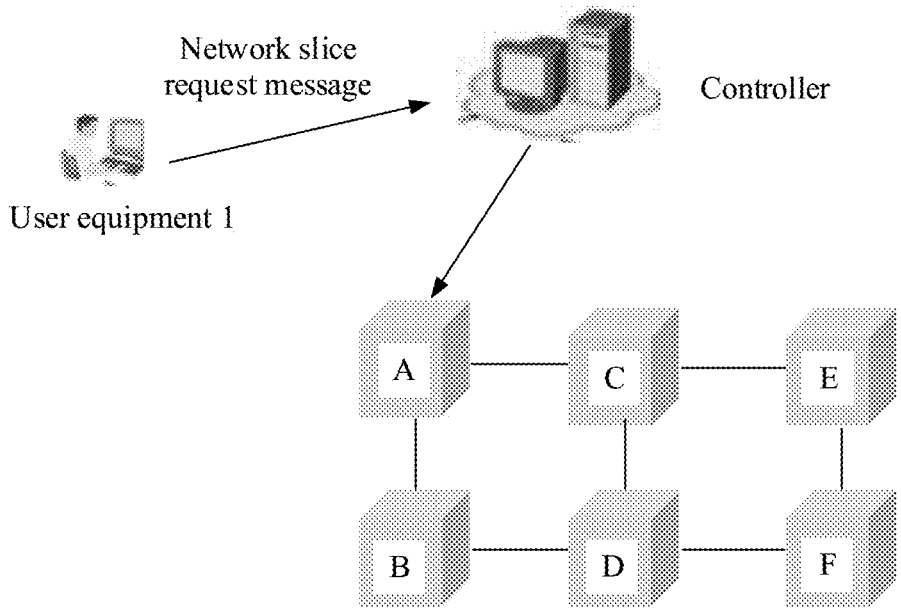
FIG. 1B is a schematic framework diagram of another data processing method according to an embodiment.

Subsequently, as shown in FIG. 1B, after creating a network slice, the controller may also deliver information about the network slice to the forwarding device A. In this case, the forwarding device A may be understood as a target forwarding device, and the controller delivers the information about the network slice to the target forwarding device. Then, the target forwarding device floods the information about the network slice in the network topology, to notify another forwarding device. This is not specifically limited in this disclosure. In the following embodiments, only the manner in FIG. 1B is used for description.

Figure 2A:
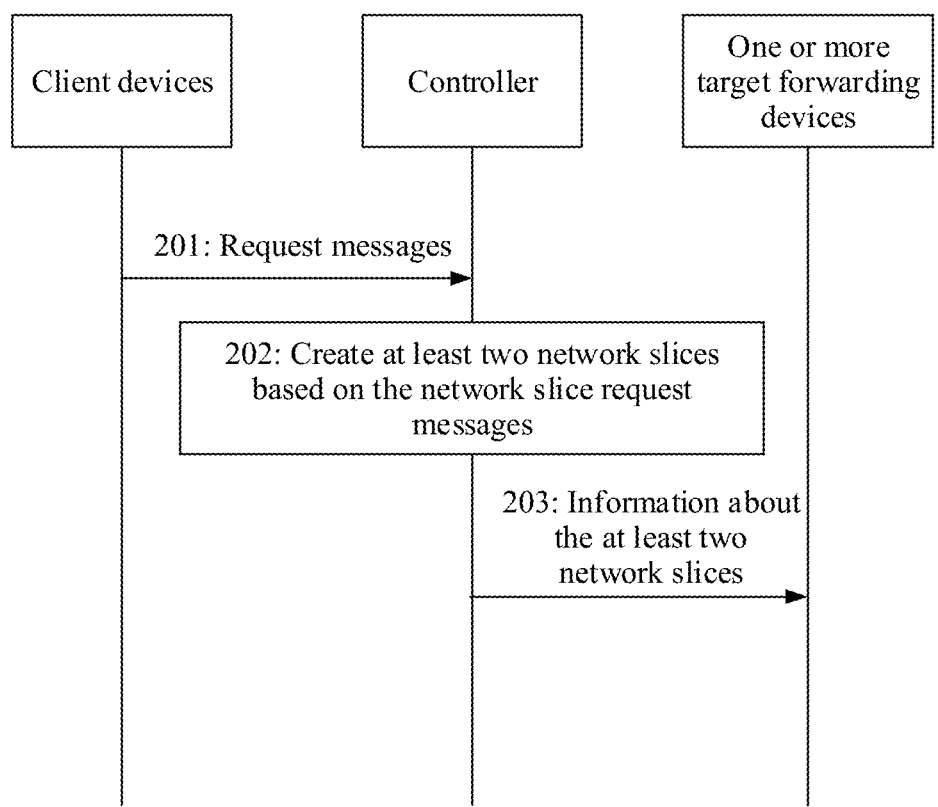
FIG. 2A is a schematic diagram of an embodiment of a data processing method according to an embodiment.

A process in which a controller creates a network slice is described below by using FIG. 2A. Referring to FIG. 2A, an embodiment of a data processing method includes the following steps.

201: The controller receives request messages sent by client devices.

Figure 2B:
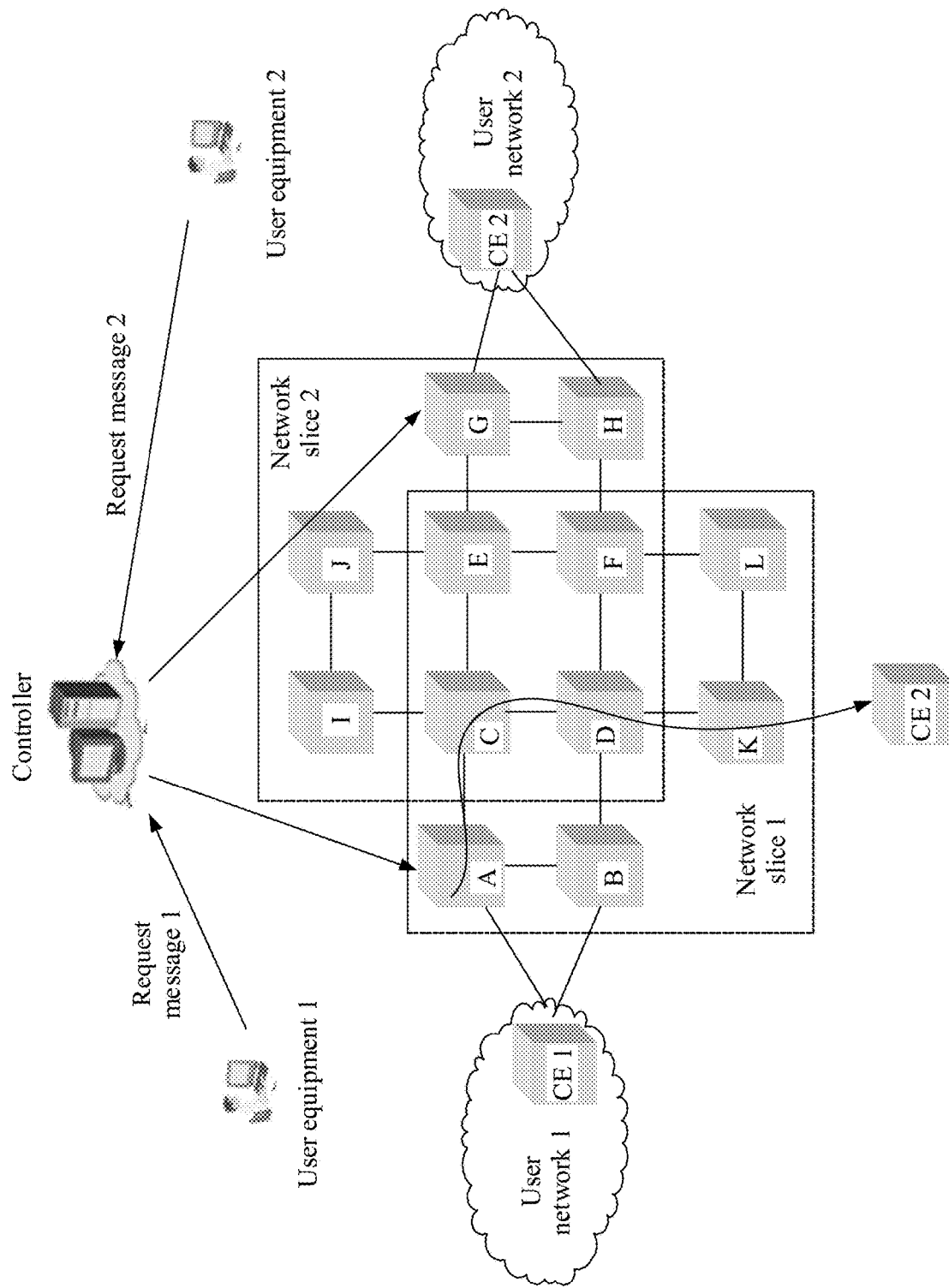
FIG. 2B is a schematic scenario diagram of a data processing method according to an embodiment.

The client devices may send the request messages to the controller. The request messages are messages used by the client devices to request the controller to create network slices. The client device may be a controller of a client, or may be user equipment. This is not specifically limited in this disclosure. It should be noted that the request messages may include request messages sent by a plurality of client devices to the controller. As shown in FIG. 2B, currently, user equipment 1 and user equipment 2 send a request message 1 and a request message 2 to the controller.

202: The controller creates at least two network slices based on the request messages.

After receiving the request messages sent by the client devices, the controller may create the at least two network slices based on the request messages. As shown in FIG. 2B, the request messages include the request message 1 and the request message 2. In this case, the controller may create a network slice 1 for the user equipment 1 based on the request message 1, and create a network slice 2 for the user equipment 2 based on the request message 2. A specific process in which the controller creates the network slice 1 and the network slice 2 is described below with reference to FIG. 2B and FIG. 2C.

Figure 2C:
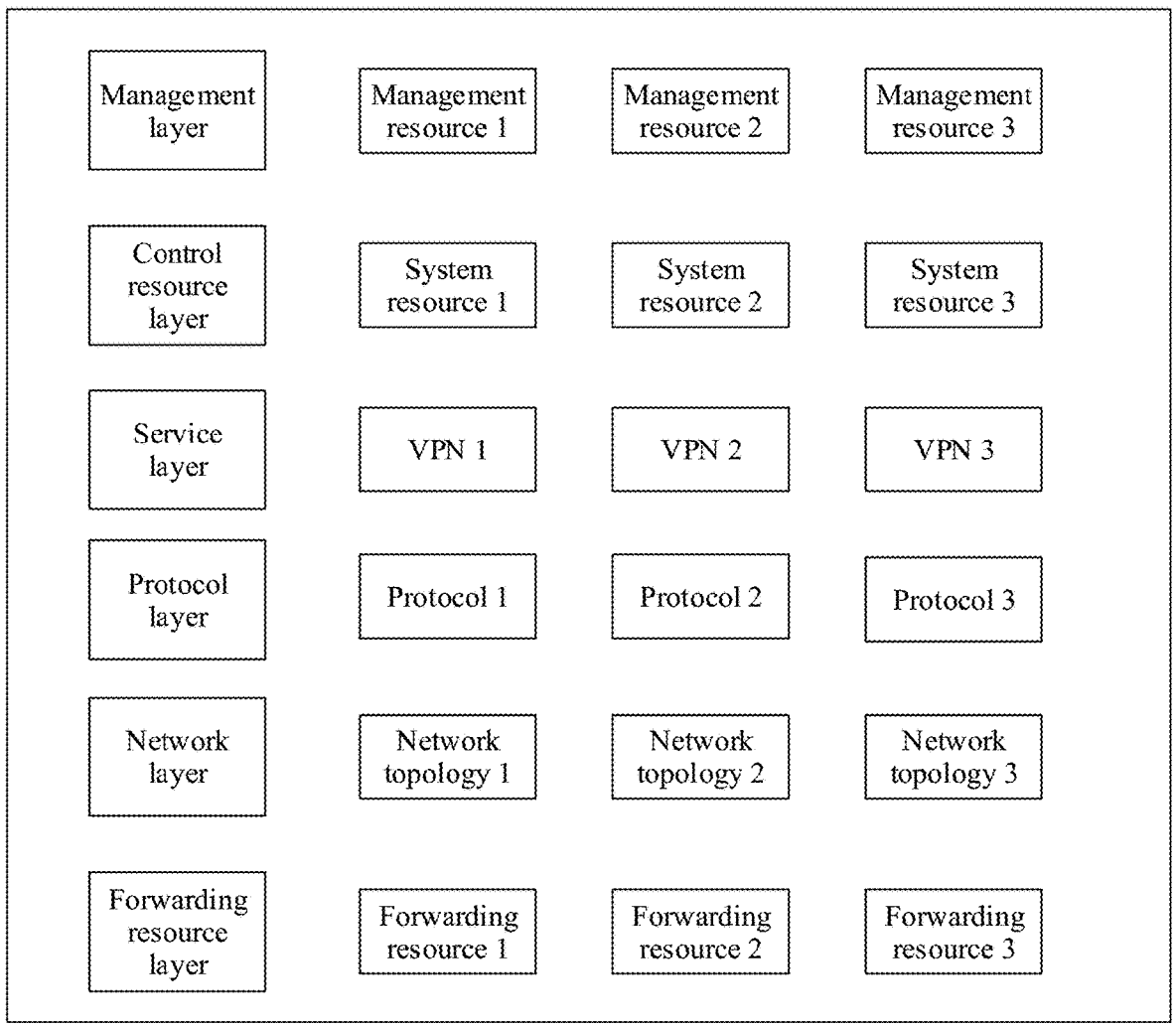
FIG. 2C is a schematic framework diagram of a network slice architecture according to an embodiment.

First, a network slice architecture provided in this embodiment is described with reference to FIG. 2C. As shown in FIG. 2C, the network slice architecture includes six layers: a management layer, a control resource layer, a service layer, a protocol layer, a network layer, and a forwarding resource layer. Each layer includes resource objects that meet different network slice requirements. The controller may create a resource object at each layer based on a network slice requirement. Network slices may share a resource object at each layer.

As shown in FIG. 2C, resource objects at the management layer include a management resource 1, a management resource 2, and the like. These resource objects at the management layer are used to meet a requirement of performing differentiated management on network slices. The management resource may be a management protocol, a management language, or the like. For example, the management protocol may be Network Configuration Protocol (NETCONF), the management language may be Yet Another Next Generation (YANG) language, and YANG is a data modeling language for NETCONF modeling. Resource objects at the control resource layer include a system resource 1, a system resource 2, and the like. These resource objects at the control resource layer implement isolation of system resources used by network slices. The system resource may include a port, a CPU, a memory, and the like of a forwarding device. In a public network, corresponding system resources are isolated for private network routing and route learning.

Resource objects at the service layer include a VPN 1, a VPN 2, and the like. These resource objects at the service layer implement isolation of services supported by network slices. Resource objects at the protocol layer include a protocol 1, a protocol 2, and the like. These resource objects at the protocol layer are used to support differentiated solutions for different services. A to-be-used protocol may be set according to an actual requirement. Resource objects at the network layer include a network topology 1, a network topology 2, and the like. These resource objects at the network layer are used to meet a requirement that network topologies used for forwarding data packets carried by different network slices are different. Resource objects at the forwarding resource layer include a forwarding resource 1, a forwarding resource 2, and the like. These resource objects at the forwarding resource layer enable network slices to share a forwarding resource at the forwarding resource layer. The forwarding resource may be a sub-interface, traffic, or the like of a forwarding device. Alternatively, resource objects associated with network slices may be different. Specifically, a resource object may be created for a network slice at a corresponding layer in the network slice architecture according to an actual requirement of the network slice, to meet the requirement of the network slice, thereby implementing resource isolation.

It should be noted that the network slice architecture in FIG. 2C is merely a possible implementation provided in this embodiment. During actual application, the network slice architecture may further include more layers. This may be specifically set and extended according to an actual requirement. This disclosure imposes no limitation thereto.

The following describes a process in which the controller creates the network slice 1. The controller receives the request message 1 sent by the user equipment 1, and then the controller determines, based on information about a network access point of a service of the user equipment 1, to calculate a network topology corresponding to the network slice 1. As shown in FIG. 2B, the service of the user equipment 1 may include the following network access points: forwarding devices A, B, K, and L. The controller may use location information of these access points as path parameters, and then determine, based on the path parameters and a preset algorithm, that the network slice 1 corresponds to the network topology 1. The network topology 1 includes forwarding devices A, B, C, D, E, F, K and L. Referring to FIG. 2C, the controller may first determine whether the network topology 1 exists at the network layer in the network slice architecture. If the network topology 1 exists, the controller does not need to create the network topology, and may share the network topology 1 at the network layer, in other words, the controller associates the network slice 1 with the network topology 1. If the network topology 1 does not exist, the controller creates the network topology 1 at the network layer, and then associates the network slice 1 with the network topology 1.

In a specific embodiment, the request message 1 carries protocol requirement information of a first service carried by the network slice 1. The controller may determine, based on the protocol requirement information, that a protocol requirement of the first service carried by the network slice 1 is the protocol 1, and the controller may determine whether the protocol 1 exists at the protocol layer in the network slice architecture shown in FIG. 2C. If the protocol 1 exists, the controller may associate the network slice 1 with the protocol 1, in other words, the network slice 1 shares the protocol 1. If the protocol 1 does not exist, the controller may create the protocol 1 for the network slice 1 at the protocol layer in the network slice architecture based on the protocol requirement information, and then associate the protocol 1 with the network slice 1.

In a possible implementation, the request message 1 further carries quality of service requirement information of the first service carried by the network slice 1, and the quality of service requirement information may include a service-level agreement (SLA), a convergence ratio, and the like of the first service. The SLA of the first service may include latency information, bandwidth requirement information, and the like required by the first service. Subsequently, the controller calculates, based on a preset algorithm, and the latency information and the bandwidth requirement information required by the first service, the forwarding resource 1 that is at the forwarding resource layer and that corresponds to the network slice 1, and then determines whether the forwarding resource 1 exists at the forwarding resource layer in the network slice architecture in FIG. 2C. If the forwarding resource 1 exists, the controller associates the network slice 1 with the forwarding resource 1, thereby implementing forwarding resource sharing. If the forwarding resource 1 does not exist, the controller first creates the forwarding resource 1 at the forwarding resource layer, and then associates the network slice 1 with the forwarding resource 1. In addition, the forwarding resource at the forwarding resource layer may be understood as a sub-interface, traffic, or the like of a forwarding device.

When forwarding resource isolation needs to be implemented based on the quality of service requirement of the first service, the controller may further allocate a sub-interface of a corresponding forwarding device to the network slice 1. Specifically, the controller may allocate the corresponding sub-interface to the network slice 1 by using a flexible Ethernet (FlexE) technology, or allocate the corresponding sub-interface to the network slice 1 in a slot manner. This is not specifically limited in this disclosure. In the following embodiments, an example in which a forwarding resource is a sub-interface of a forwarding device is used for description.

In another possible implementation, the request message 1 carries management requirement information of the network slice 1. The management requirement information indicates that the network slice 1 needs to independently manage running data and management data of the network slice 1. The management requirement information may carry an identifier indicating a requirement of the user equipment 1 for managing data of the network slice at each layer in the network slice architecture. Subsequently, the controller determines, based on the identifier, that the network slice 1 corresponds to the management resource 1 at the management layer, and then the controller determines whether the management resource 1 exists at the management layer. If the management resource 1 exists, the controller associates the network slice 1 with the management resource 1. If the management resource 1 does not exist, the controller may create the management resource 1 at the management layer, and associate the network slice 1 with the management resource 1. The management resource 1 may be understood as a management object 1 shown in FIG. 2D, and is used to manage the running data and the management data corresponding to the network slice 1. Then, the controller allocates a corresponding management address 1 to the management object 1. In this case, the user equipment 1 may access, by using the management address 1, the running data and the management data in the management object 1 that are associated with the network slice 1.

In addition, the request message 1 may further carry routing requirement information. For example, the routing requirement information indicates that the user equipment 1 needs to maintain a private network route of a user network 1 on an independent control plane at an edge node. The routing requirement information includes a quantity of private network routes in the user network 1. Then, the controller creates the system resource 1 on the forwarding device A based on the quantity of private network routes. The system resource 1 may include a port, a CPU, a memory, and the like of the forwarding device A. For example, if a virtual system (VS) 1 is created on the forwarding device A, both the private network route in the user network 1 and a protocol running the private network route may be run in the VS 1. If it is determined that the system resource 1 exists at the control resource layer, the controller does not need to create the system resource 1, and directly associates the network slice 1 with the system resource 1. If the user equipment 1 further expects to perform route learning on a private network side through the protocol 1, the controller further needs to create the protocol 1 in the VS 1, and then all forwarding interfaces connected to the user network 1 also run the protocol 1.

In a specific embodiment, the request message 1 may further carry tenant information. For example, if the user network 1 has a tenant, the controller obtains location information of the tenant, then determines an edge node device at a location of the tenant, and creates the VPN 1 for the network slice 1 based on the edge node device. Before creating the VPN 1, the controller first queries whether the VPN 1 exists at the service layer. If the VPN 1 exists, the controller associates the network slice 1 with the VPN 1. If the VPN 1 does not exist, the controller creates the VPN 1 at the service layer. It can be learned from the foregoing descriptions that resource objects that are at all the layers in the network slice architecture and that are associated with the network slice 1 include the management resource 1, the system resource 1, the VPN 1, the protocol 1, the network topology 1, and the forwarding resource 1.

The following describes a process of creating the network slice 2. First, the controller receives the request message 2 sent by the user equipment 2, and the controller calculates, based on information about a network access point of a service of the user equipment 2, a network topology corresponding to the network slice 2. As shown in FIG. 2B, the service of the user equipment 2 includes the following network access points: forwarding devices G, H, I, and J. The controller uses location information of these access points as path parameters, and then may determine, based on the path parameters and a preset algorithm, that the network slice 2 corresponds to the network topology 2. The network topology 2 includes forwarding devices C, D, E, F, G, H, I, and J. Referring to FIG. 2C, the controller first determines whether the network topology 2 exists at the network layer in the network slice architecture. If the network topology 2 exists, the controller does not need to create the network topology 2, and may share the network topology 2 at the network layer, in other words, the controller associates the network slice 2 with the network topology 2.

In a specific embodiment, the request message 2 carries protocol requirement information of a second service carried by the network slice 2, and the protocol requirement information may include a protocol ID. The controller may determine, based on the protocol ID, that a protocol required by the second service carried by the network slice 2 is the protocol 2, and the controller may determine whether the protocol 2 exists at the protocol layer. If the protocol 2 exists, the controller associates the network slice 2 with the protocol 2. If the protocol 2 does not exist, the controller first creates the protocol 2 at the protocol layer, and then associates the network slice 2 with the protocol 2.

In a possible implementation, the request message 2 may further carry quality of service requirement information of the second service carried by the network slice 2, and the quality of service requirement information may include latency information and bandwidth requirement information required by the second service. Subsequently, the controller may calculate, based on the latency information and the bandwidth requirement information, the forwarding resource 2 corresponding to the network slice 2, and then determine whether the forwarding resource 2 exists at the forwarding resource layer. If the forwarding resource 2 exists, the controller associates the network slice 2 with the forwarding resource 2, thereby implementing forwarding resource sharing. If the forwarding resource 2 does not exist, the controller first creates the forwarding resource 2 at the forwarding resource layer, and then associates the network slice 2 with the forwarding resource 2.

Figure 2D:
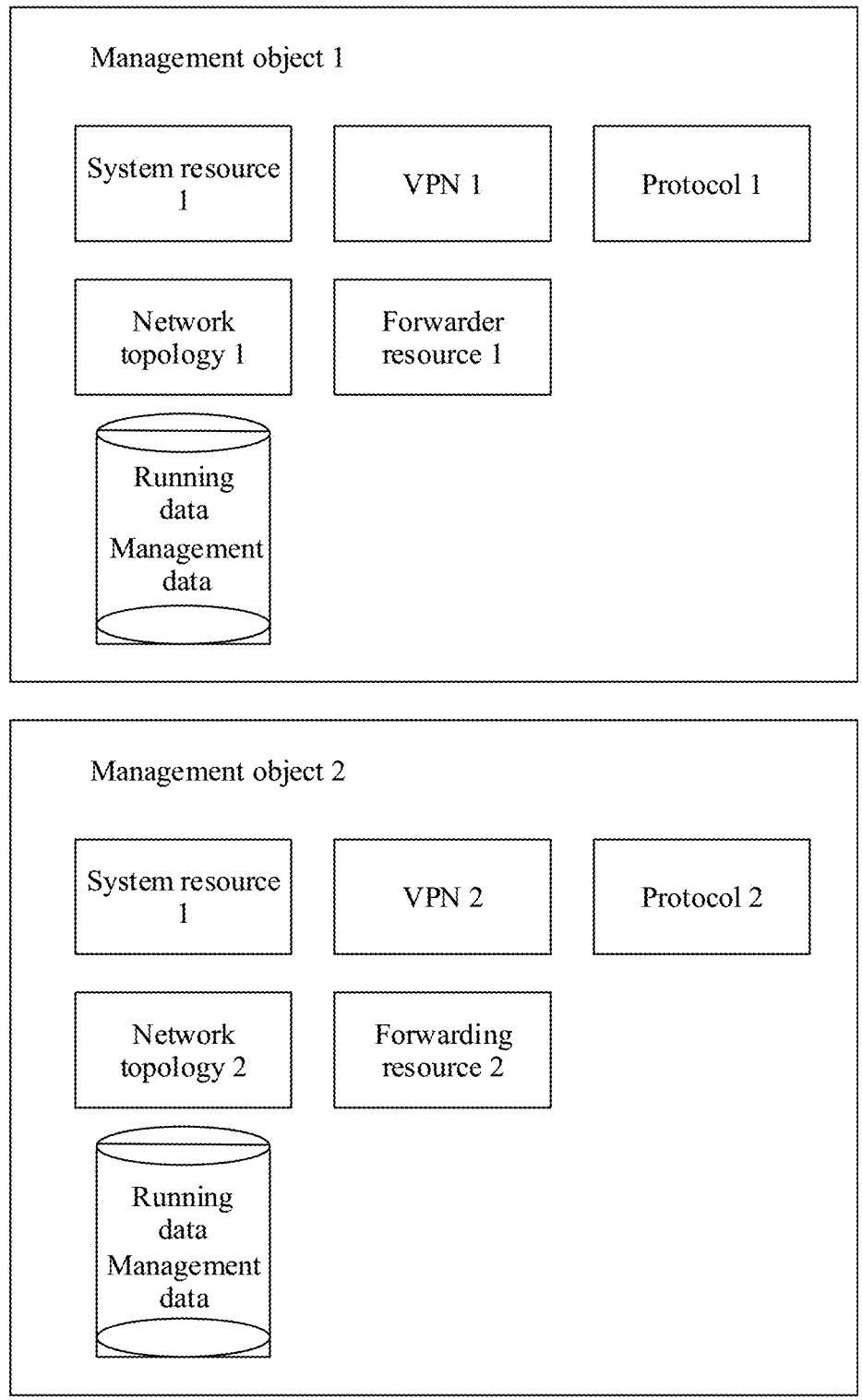
FIG. 2D is a schematic structural diagram of a management object at a management layer in a network slice architecture according to an embodiment.

In addition, the request message 2 carries management requirement information of the network slice 2. The management requirement information may carry a management identifier indicating a requirement of the user equipment 2 for managing data of the network slices 2 at each layer in the network slice architecture. Subsequently, the controller determines, based on the management identifier, that the network slice 2 corresponds to the management resource 2 at the management layer, and then the controller may determine whether the management resource 2 exists at the management layer. If the management resource 2 exists, the controller associates the network slice 2 with the management resource 2. If the network slice 2 does not exist, the controller creates the management resource 2 for the network slice 2 at the management layer based on the management requirement information, and then associates the network slice 2 with the management resource 2. As shown in FIG. 2D, the management resource 2 may be understood as a management object 2. The controller allocates a corresponding management address 2 to the management object 2. In this case, the user equipment 2 may access, by using the management address 2, running data and management data in the management object 2 that are associated with the network slice 2, so as to manage the data of the network slice. A management object is created at the management layer to manage data of a network slice, thereby implementing efficient data management.

In addition, the request message 2 may further carry routing requirement information. For example, the routing requirement information indicates that the user equipment 2 needs to maintain a private network route of a user network 2 on an independent control plane at an edge node. The routing requirement information includes a quantity of private network routes in the user network 2. Then, the controller creates, based on the quantity of private network routes, the system resource 2 on the forwarding device G that is directly connected to the user network 2. The system resource 2 may include the port, the CPU, the memory, and the like of the forwarding device A. For example, if a VS 2 is created, both the private network route in the user network 2 and a protocol running the private network route may be run in the VS 2. If it is determined that the system resource 2 exists at the control resource layer, the controller does not need to create the system resource 2, and directly associates the network slice 2 with the system resource 2. If the user equipment 2 further requests to perform route learning on a private network side through the protocol 2, the controller further needs to create the protocol 2 in the VS 2, and then all forwarding interfaces connected to the user network 2 also run the protocol 2.

In a specific embodiment, the request message 2 may further carry tenant information. For example, if the user network 2 has a tenant, the controller obtains location information of the tenant, then determines an edge node device at a location of the tenant, and creates the VPN 2 for the network slice 2 based on the edge node device. In this case, the controller first queries whether the VPN 2 exists at the service layer. If the VPN 2 exists, the controller associates the network slice 1 with the VPN 2. If the VPN 2 does not exist, the controller creates the VPN 2 at the service layer. It can be learned from the foregoing descriptions that resource objects that are at all the layers in the network slice architecture and that are associated with the network slice 2 include the management resource 2, the system resource 2, the VPN 2, the protocol 2, the network topology 2, and the forwarding resource 2.

Therefore, in this embodiment, resource pooling is performed on a network resource at each layer in the network slice architecture. Network slices may share a resource object in the resource pool. To be specific, the network slices may share a management resource, a system resource, a VPN, a network topology, a forwarding resource, a protocol to support services of the network slices, and the like. In addition, network resource isolation may be performed to implement service isolation.

203: The controller sends information about the at least two network slices to one or more target forwarding devices.

After the controller creates the at least two network slices based on the request messages, the controller may send the information about the at least two network slices to the one or more target forwarding devices. It should be noted that a target forwarding device may be understood as a forwarding device determined by the controller based on a network topology corresponding to each network slice. The network slice 1 is used as an example for description. The controller determines a network topology corresponding to the network slice 1. As shown in FIG. 2B, the network topology includes the forwarding devices A, B, C, D, E, F, K and L. In this case, the controller may send information about the network slice 1 to the edge forwarding device A in the network topology. The information about the network slice 1 may include a mapping relationship between the network slice 1 and a resource object at each layer in the network slice architecture. For the network slice 2, the controller may determine, based on the request message 2, resource objects that are at all the layers in the network slice architecture and that are associated with the network slice 2. It can be learned from the content described in step 202 that the resource objects that are at all the layers in the network slice architecture and that are associated with the network slice 2 include the management resource 2, the system resource 2, the VPN 2, the protocol 2, the network topology 2, and the forwarding resource 2. These resource objects are created for the network slice 2 based on service requirement information carried in the request message of the user equipment 2. Then, the controller may send information about the network slice 2 to the forwarding device G.

It should be noted that, when delivering the information about the at least two network slices, the controller first delivers the information about the at least two network slices to the one or more corresponding target forwarding devices. Then, if the client devices that request to create the at least two network slices belong to a network managed and controlled by the controller, the controller does not need to deliver the information about the network slices to the client devices. However, if the client devices do not belong to a network managed and controlled by the controller, in other words, if the controller creates the network slices for the client devices to merely provide a function link for the client devices, the controller needs to deliver network topologies associated with the network slices created for the client devices and packet forwarding path information to the client devices. The client devices determine, based on the path information and the network topologies associated with the network slices, connected network interfaces for transmitting data packets, and sends the data packets.

In this embodiment, the information about the at least two network slices may include a mapping relationship between each of the at least two network slices and a resource object at each layer in the network slice architecture.

It should be noted that, after creating a network slice, the controller further allocates a corresponding segment routing label and link label to each network slice, so that a forwarding device subsequently forwards a data packet carried by the network slice 1. The segment routing label and the link label may be understood as the information about the network slice. To be specific, when delivering the mapping relationship between the network slice and the resource object at each layer in the network slice architecture to a target forwarding device, the controller also delivers the segment routing label and the link label to the target forwarding device. Then, after receiving the information about the network slice, the target forwarding device synchronizes the related information about the network slice in a corresponding network topology through flooding. For example, for the network slice 1, after receiving the information about the network slice 1, the forwarding device A may notify, in a network topology corresponding to the network slice, another forwarding device in the network topology through protocol extension.

In this embodiment, the controller obtains the request messages. The request messages are messages used by client devices to request to create network slices. The controller creates the at least two network slices based on the request messages. The at least two networks include the first network slice and the second network slice. The first network slice and the second network slice share the resource object at each layer in the network slice architecture. Then, the controller sends the information about the at least two network slices to the one or more target forwarding devices. The information about the at least two network slices includes the information about the first network slice and the information about the second network slice. The information about the first network slice is used to indicate the resource object that is at each layer in the network slice architecture and that is associated with the first network slice. The information about the second network slice indicates the resource object that is at each layer in the network slice architecture and that is associated with the second network slice. The network slice architecture includes at least one of the management layer, the control resource layer, the service layer, the protocol layer, the network layer, and the forwarding resource layer. Therefore, according to the technical solution, network slices can share a resource object at each layer in the network slice architecture, so that a network slicing technology is decoupled from a specific isolation technology, thereby improving application flexibility of the network slicing technology.

Figure 3A:
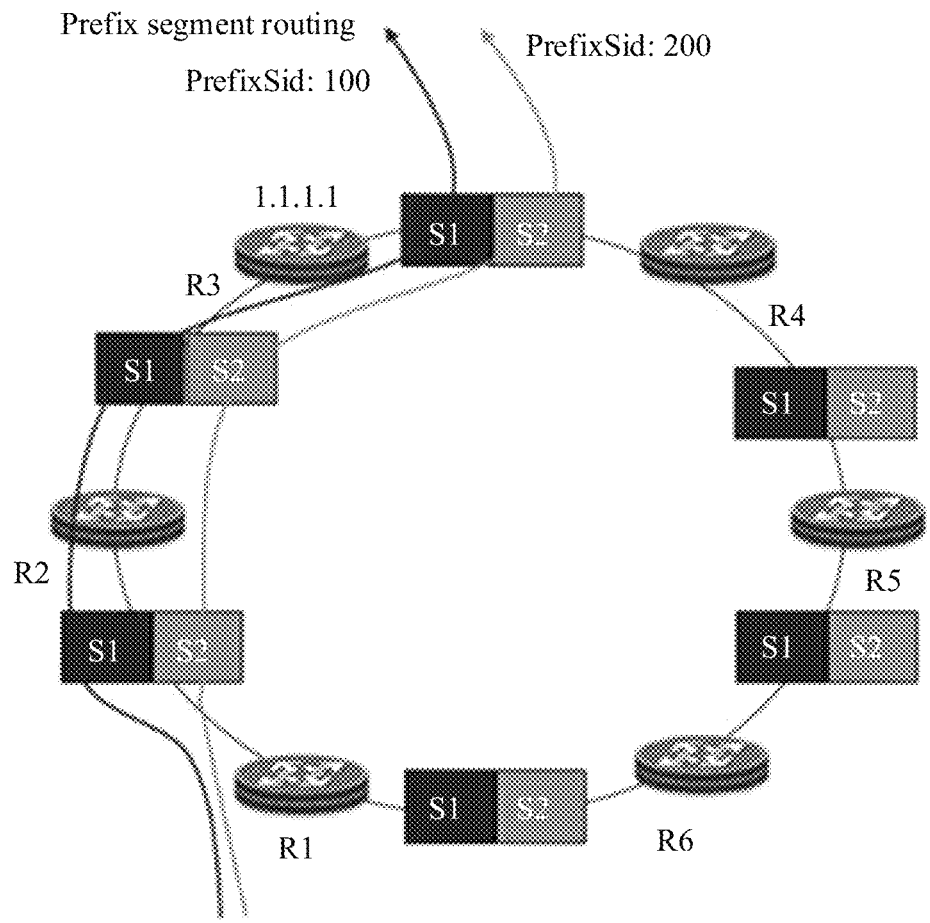
FIG. 3A is a schematic structural diagram of a network topology associated with a network slice according to an embodiment.
Figure 3B:
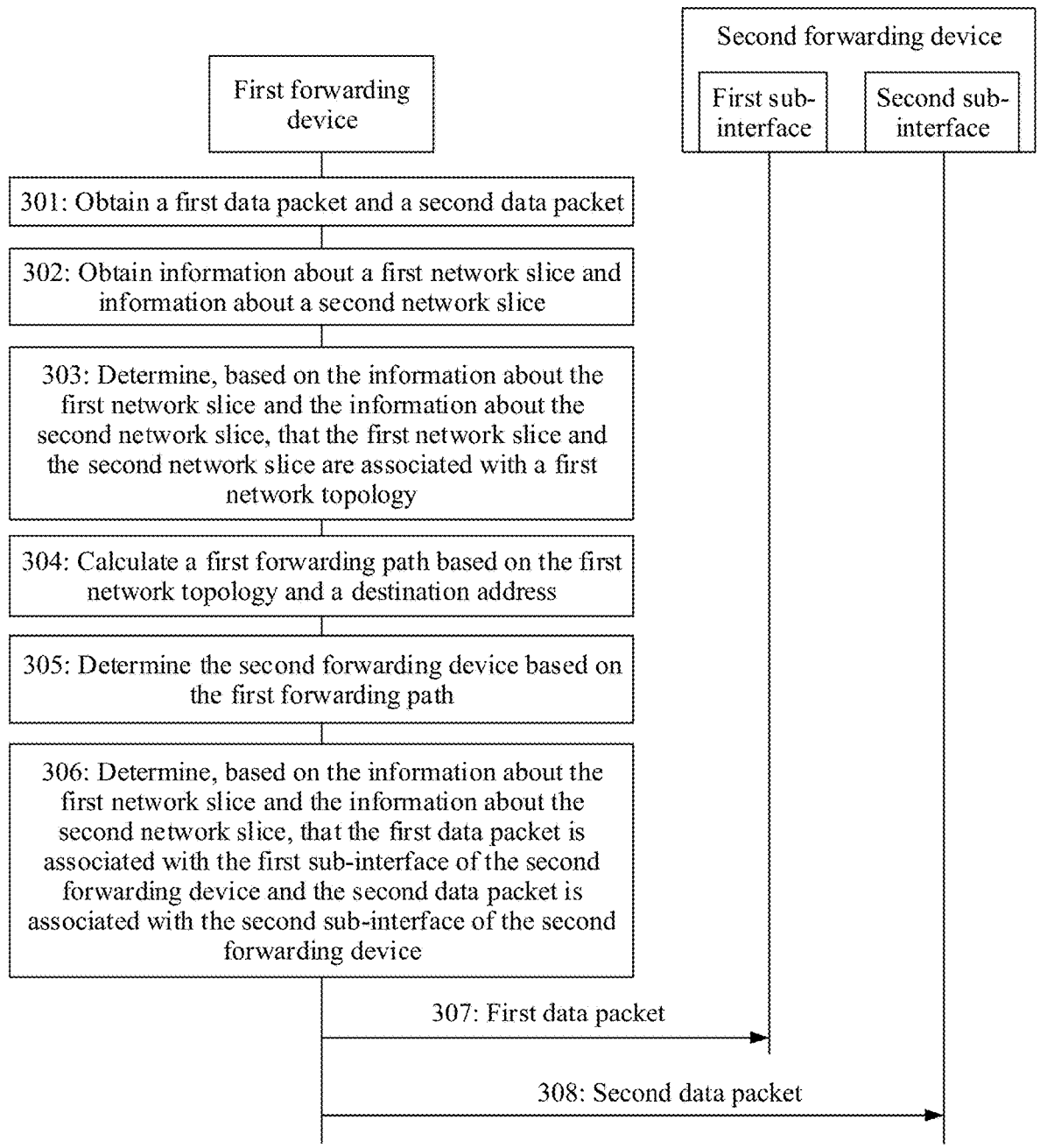
FIG. 3B is a schematic diagram of another embodiment of a data processing method according to an embodiment.

Referring to FIG. 3A, the following describes a process in which network topologies associated with a first network slice and a second network slice that are created by a controller both are a first network topology, and a first forwarding device forwards a first data packet carried by the first network slice and forwards a second data packet carried by the second network slice. Referring to FIG. 3A, the first network topology includes forwarding devices R1, R2, R3, R4, R5, and R6. An example in which the first forwarding device is the forwarding device R1 in FIG. 3A is used for description, and an example in which destination addresses of the first data packet and the second data packet are R3 is used to describe a process of forwarding the first data packet and the second data packet through a forwarding path R1-R2-R3. Referring to FIG. 3B below, another embodiment of a data processing method includes the following steps.

301: The first forwarding device obtains the first data packet and the second data packet.

Referring to FIG. 3A, the first forwarding device is the forwarding device R1, and the first data packet and the second data packet are respectively data used by user equipment 1 and user equipment 2 to perform service transmission. When the first forwarding device receives the first data packet and the second data packet, it may be determined, based on a slice ID carried in the first data packet, that the first data packet is a data packet carried by the first network slice, and it may be determined, based on a slice ID carried in the second data packet, that the second data packet is a data packet carried by the second network slice. In addition, the first data packet and the second data packet have a same destination address, and both are data packets to be forwarded to the forwarding device R3.

It should be noted that the controller first delivers information about the first network slice and information about the second network slice to one or more corresponding target forwarding devices. Subsequently, if a network used by user equipment belongs to a network managed and controlled by the controller, the controller does not need to deliver information about a network slice to the user equipment. However, if a network used by user equipment does not belong to a network range managed and controlled by the controller, the controller needs to deliver information about a path associated with a network slice to the user equipment. The path information may include a network topology associated with the network slice, and the like, and is used by the user equipment to connect to a corresponding network interface by using the path information, to send a data packet.

302: The first forwarding device obtains the information about the first network slice and the information about the second network slice.

If the first forwarding device determines that the first data packet is associated with the first network slice and the second data packet is associated with the second network slice, the first forwarding device requests to obtain the information about the first network slice and the information about the second network slice from the controller. The information about the first network slice may include a mapping relationship between the first network slice and a resource object at each layer in a network slice architecture. The information about the second network slice includes a mapping relationship between the second network slice and a resource object at each layer in the network slice architecture. Details are described in Table 1 and Table 2. In addition, the information about the first network slice and the information about the second network slice may be delivered by the controller to the first forwarding device before the first forwarding device obtains the first data packet and the second data packet, or may be delivered by the controller to the first forwarding device after the first forwarding device obtains the first data packet and the second data packet. This is not specifically limited in this disclosure.

TABLE 1

| Information about the first network slice |
|---|
| Slice/Slicing ID: 1 |
| Resource (ID): 10 |
| Network topology ID: 100 |
| VPN-instance: VPN 1 |
| Virtual-system: VS 1 |
| Admin Object ID: 1 |
| Protocol ID: 1 |

TABLE 2

| Information about the second network slice |
|---|
| Slicing ID: 2 |
| Resource ID: 20 |
| Network topology ID: 100 |
| VPN-instance: VPN 2 |
| Virtual-system: VS 2 |
| Admin Object ID: 2 |
| Protocol ID: 2 |

303: The first forwarding device determines, based on the information about the first network slice and the information about the second network slice, that the first network slice and the second network slice are associated with the first network topology.

The first forwarding device may determine, based on the information about the first network slice and the information about the second network slice, that the first network slice and the second network slice are associated with the first network topology. An example in which the first network slice is a network slice S1 shown in FIG. 3A and the second network slice is a network slice S2 shown in FIG. 3A is used for description. In a specific embodiment, mapping relationships between the network slices S1 and S2 and resource objects at each layer in the network slice architecture are shown in Table 1 and Table 2. The first forwarding device may determine, based on the mapping relationships, that the first network slice and the second network slice are associated with the first network topology, and a network topology ID of the first network topology is 10. For example, as shown in FIG. 3A, the first network topology determined by the first forwarding device is a network topology including the forwarding devices R1, R2, R3, R4, R5, and R6.

304: The first forwarding device calculates a first forwarding path based on the first network topology and the destination address.

In a specific embodiment, after the first forwarding device determines the first network topology, and the first data packet and the second data packet have a same destination address, the first forwarding device may calculate the first forwarding path of the first data packet based on the first network topology and the destination address.

The following uses FIG. 3A for description. The destination addresses of the first data packet and the second data packet both are an address of the forwarding device R3. Herein, for example, a network address of the forwarding device R3 is 1.1.1.1. In this case, the first forwarding device may calculate a first forwarding path based on the first network topology and the destination address, that is, R1-R2-R3. Herein, an example of calculating a forwarding path by using a shortest path algorithm is used for description. During actual application, a corresponding path calculation method may be determined according to an actual situation or a requirement. This is not specifically limited in this disclosure.

305: The first forwarding device determines a second forwarding device based on the first forwarding path.

In a specific embodiment, the first forwarding device may determine, based on the first forwarding path, that a next-hop address points to the second forwarding device. As shown in FIG. 3A, if the first forwarding device is the forwarding device R1, R1 may determine that the first forwarding path is R1-R2-R3. In this case, R1 may determine, based on the first forwarding path, that the next-hop address is R2, to be specific, R1 may determine to forward the first data packet and the second data packet from R1 to R2.

306: The first forwarding device determines, based on the information about the first network slice and the information about the second network slice, that the first data packet is associated with a first sub-interface of the second forwarding device and the second data packet is associated with a second sub-interface of the second forwarding device.

The first forwarding device may determine, based on the information about the first network slice and the information about the second network slice that are shown in Table 1 and Table 2, that a forwarding resource ID of a first forwarding resource that is at a forwarding resource layer and that is associated with the first network slice is 10, and a forwarding resource ID of a second forwarding resource that is at the forwarding resource layer and that is associated with the second network slice is 20. It can be learned from FIG. 3C that the first sub-interface of the second forwarding device that corresponds to the first forwarding resource is GE1/0/0.1, and the second sub-interface of the second forwarding device that corresponds to the second forwarding resource is GE1/0/0.2. A mapping relationship between a forwarding resource ID and an interface may be preset by a forwarding device.

In this embodiment, it can be learned from Table 1 and Table 2 that the first network slice and the second network slice share a same network topology, but a forwarding resource associated with the first network slice is different from a forwarding resource associated with the second network slice, thereby implementing resource isolation. To be specific, in the technical solution, network slices may share a resource object at each layer in the network slice architecture, and there is no need to define a separate object for each network slice, thereby saving resources at each layer.

It should be noted that, when the first forwarding device determines, based on the information about the first network slice, at least two sub-interfaces of the second forwarding device that are associated with the first data packet, the first forwarding device may select the first sub-interface from the at least two sub-interfaces based on an overhead value, or may select the first sub-interface from the at least two sub-interfaces based on a target load-balancing algorithm. The target load-balancing algorithm includes an unequal cost multipath (UCMP) or an equal-cost multi-path (ECMP). The target load-balancing algorithm is pre-configured for the first network slice in a target IGP area. Alternatively, the first sub-interface may be determined in another manner. This is not specifically limited in this disclosure. When the second data packet is associated with at least two sub-interfaces of the second forwarding device, a manner in which the first forwarding device determines the second sub-interface is similar to the foregoing process in which the first forwarding device determines the first sub-interface. Details are not described herein again.

307: The first forwarding device sends the first data packet to the first sub-interface of the second forwarding device.

After determining that the first network slice is associated with the first sub-interface of the second forwarding device, the first forwarding device may send the first data packet to the first sub-interface of the second forwarding device.

308: The first forwarding device sends the second data packet to the second sub-interface of the second forwarding device.

After determining that the first network slice is associated with the second sub-interface of the second forwarding device, the first forwarding device may send the second data packet to the second sub-interface of the second forwarding device. It should be noted that, after the first forwarding device forwards the first data packet and the second data packet to the second forwarding device, an operation performed by the second forwarding device on the first data packet and the second data packet is similar to a forwarding processing process of the first forwarding device. Details are not described herein again. For example, as shown in FIG. 3A, after receiving the first data packet and the second data packet, the forwarding device R2 forwards the first data packet and the second data packet to the forwarding device R3 through a corresponding sub-interface in R2.

In this embodiment, the first forwarding device obtains the first data packet and the second data packet, and the first data packet and the second data packet have a same destination address. The first forwarding device determines, based on the information about the first network slice and the information about the second network slice, that the first network slice and the second network slice are associated with the first network topology. The first forwarding device calculates a first forwarding path based on the first network topology and the destination address, then determines a second forwarding device based on the first forwarding path, forwards the first data packet to the second forwarding device, and forwards the second data packet to the second forwarding device. The second forwarding device is a node device on the first forwarding path. It can be learned from the technical solution that the first forwarding device may determine the second forwarding device based on the first forwarding path, and forward the second data packet corresponding to the second network slice to the second forwarding device. In other words, the first forwarding path of the first data packet corresponding to the first network slice may be shared, and the first forwarding device does not need to perform path calculation again. Therefore, in a scenario in which there are a relatively large quantity of network slices, when the plurality of network slices are associated with a same network topology, a forwarding path for forwarding the first data packet corresponding to the first network slice to the destination address may be calculated based on the network topology, the forwarding path may be shared for a data packet that corresponds to another network slice and that is to be forwarded to the destination address, and route calculation does not need to be performed based on each network slice, thereby reducing an amount of interior gateway protocol (IGP) route calculation performed by a forwarding device, and making network operation and maintenance relatively easy.

In this embodiment, in FIG. 3B, the first forwarding device forwards the second data packet to the second sub-interface of the second forwarding device by sharing the first forwarding path. However, when a first link that is between a current sub-interface of the first forwarding device and the second sub-interface of the second forwarding device and through which the second data packet passes is faulty, the first forwarding device needs to re-determine a second forwarding path for the second data packet. In the foregoing case in which the first link is faulty, the first forwarding device may re-determine the second forwarding path for the second data packet in two manners. The following separately provides detailed descriptions by using embodiments in FIG. 4A and FIG. 5A.

Figure 4A:
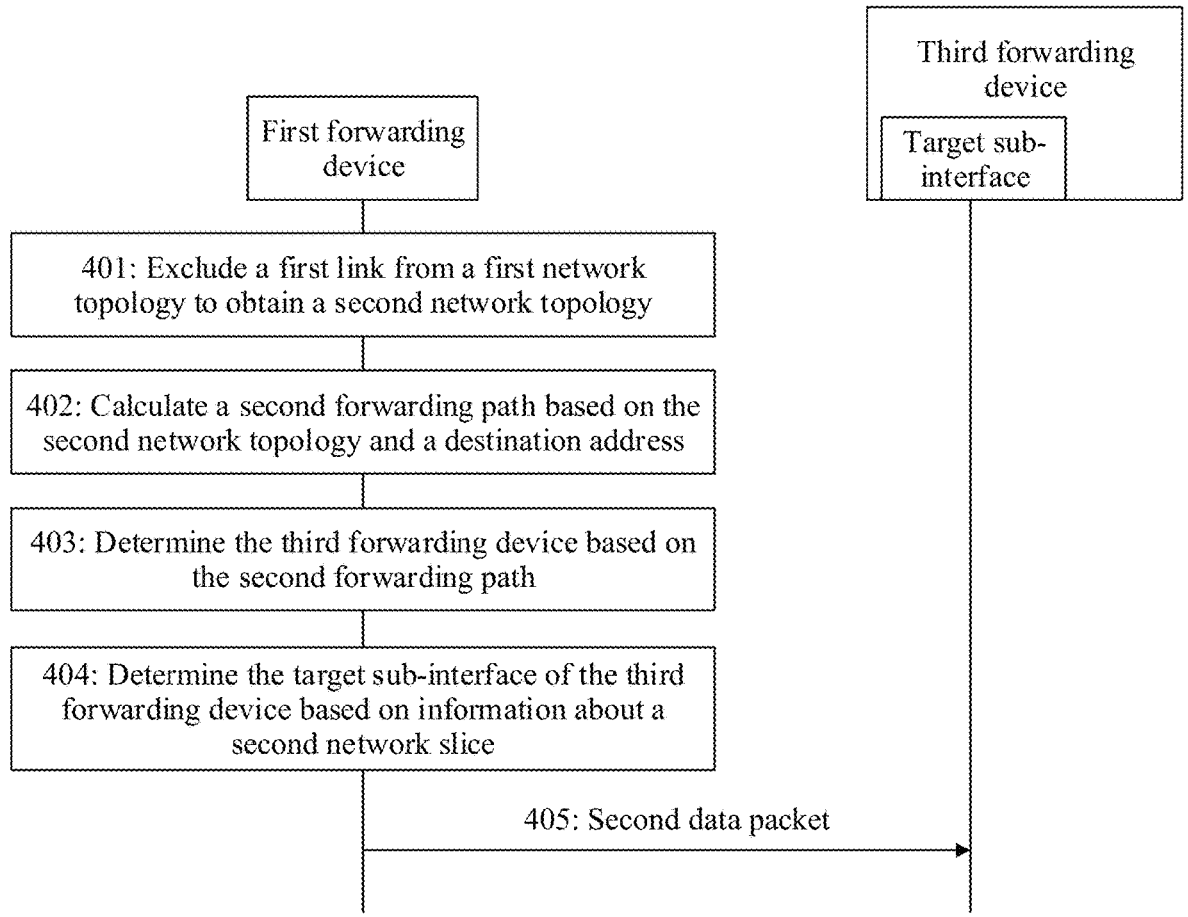
FIG. 4A is a schematic diagram of another embodiment of a data processing method according to an embodiment.

First, referring to FIG. 4A, the first forwarding device excludes the first link from the first network topology to obtain a second network topology, and then calculates a second forwarding path based on the second network topology and the destination address of the second data packet, to forward the second data packet. Another embodiment of a data processing method includes the following steps.

401: The first forwarding device excludes the first link from the first network topology to obtain the second network topology.

Figure 3C:
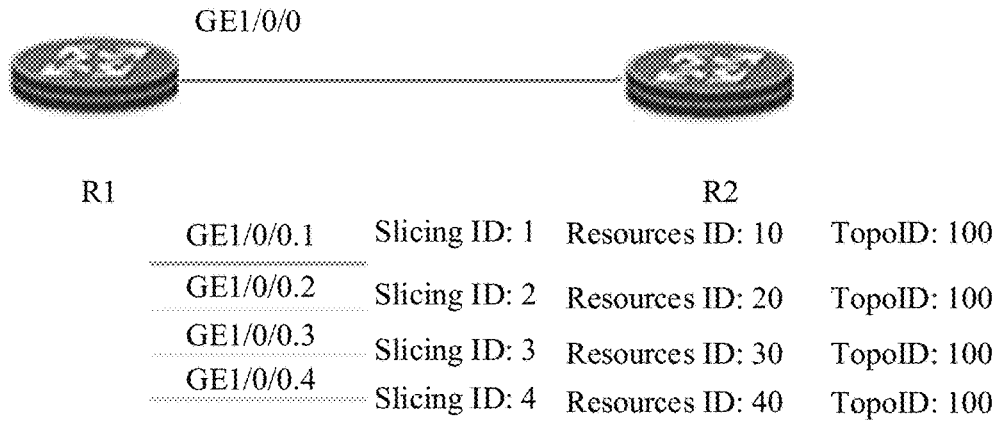
FIG. 3C is a schematic diagram of an interface structure of a forwarding device according to an embodiment.

If the first forwarding device determines that the first link is faulty, the first forwarding device may exclude the first link from the first network topology to obtain the second network topology. As shown in FIG. 3C, an example in which the first forwarding device is the forwarding device R1 is used. When a link from a sub-interface GE1/0/0.2 of R1 to a sub-interface GE2/0/0.2 of R2 is faulty, the first forwarding device excludes the link from R1 to R2 from a network topology shown in FIG. 4B, to obtain the second network topology. In other words, the second network topology includes forwarding devices R1, R3, R4, R5, and R6.

402: The first forwarding device calculates the second forwarding path based on the second network topology and the destination address.

Figure 4B:
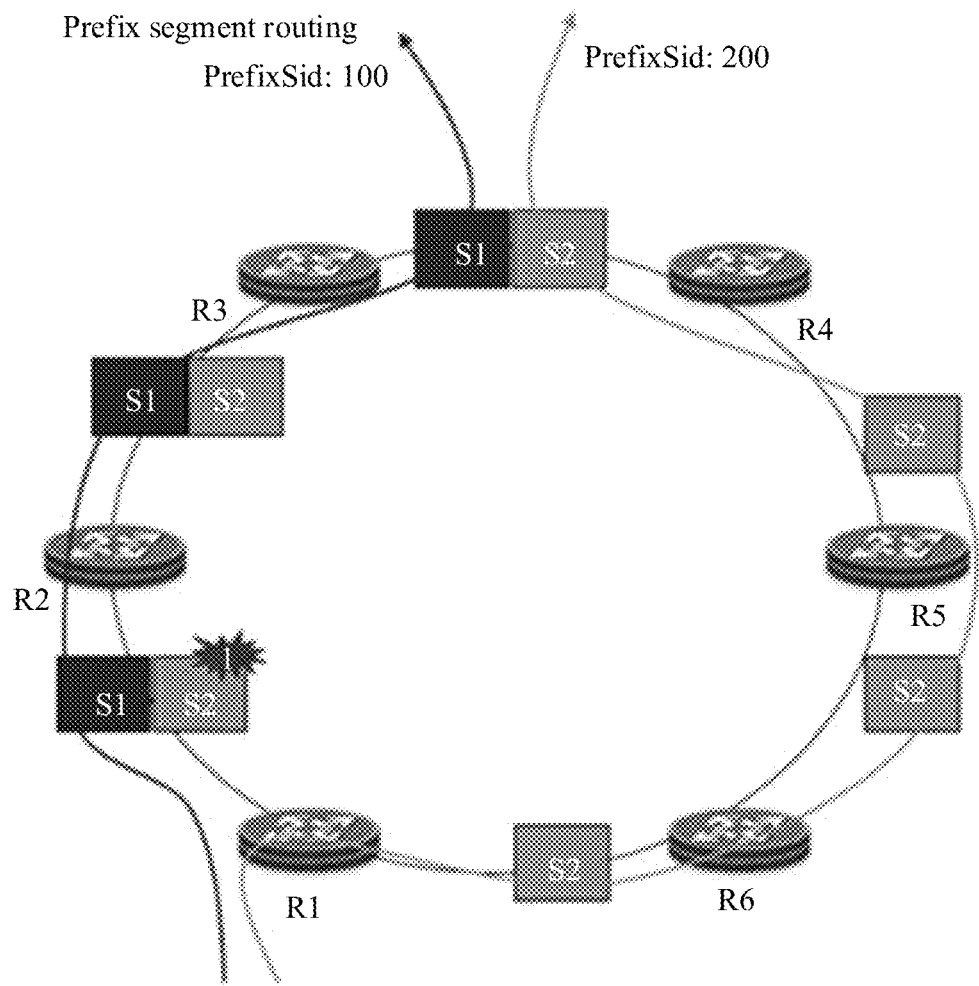
FIG. 4B is a schematic structural diagram of a network topology associated with a network slice according to an embodiment.

The first forwarding device may calculate the second forwarding path based on the second network topology and the destination address. Specifically, as shown in FIG. 4B, R1 may determine, through calculation based on the second network topology and the destination address, that the second forwarding path is R1-R6-R5-R4-R3.

403: The first forwarding device determines a third forwarding device based on the second forwarding path.

The first forwarding device may determine the third forwarding device based on the second forwarding path. As shown in FIG. 4B, R1 may determine that a next-hop address for forwarding the first data packet and the second data packet is R6.

404: The first forwarding device determines a target sub-interface of the third forwarding device based on the information about the second network slice.

The first forwarding device may determine the target sub-interface of the third forwarding device based on the information about the second network slice. It can be learned from Table 2 that the forwarding resource ID of the second forwarding resource associated with the second network slice is 20. If a sub-interface of R6 that corresponds to the forwarding resource ID currently is GE6/0/0.2, R1 may determine that the target sub-interface is the sub-interface GE6/0/0.2 of R6.

405: The first forwarding device sends the second data packet to the target sub-interface of the third forwarding device.

Step 405 is similar to step 308 in FIG. 3B, and details are not described herein again.

In this embodiment, the first forwarding device excludes the first link from the first network topology to obtain the second network topology, then calculates the second forwarding path based on the second network topology and the destination address, and determines the third forwarding device based on the second forwarding path. Finally, the first forwarding device forwards the second data packet to the third forwarding device. In this way, when the first link is faulty, the first forwarding device may recalculate a forwarding path for the second data packet, and correspondingly forward the second data packet, thereby improving completeness and practicability of the solution.

Figure 5A:
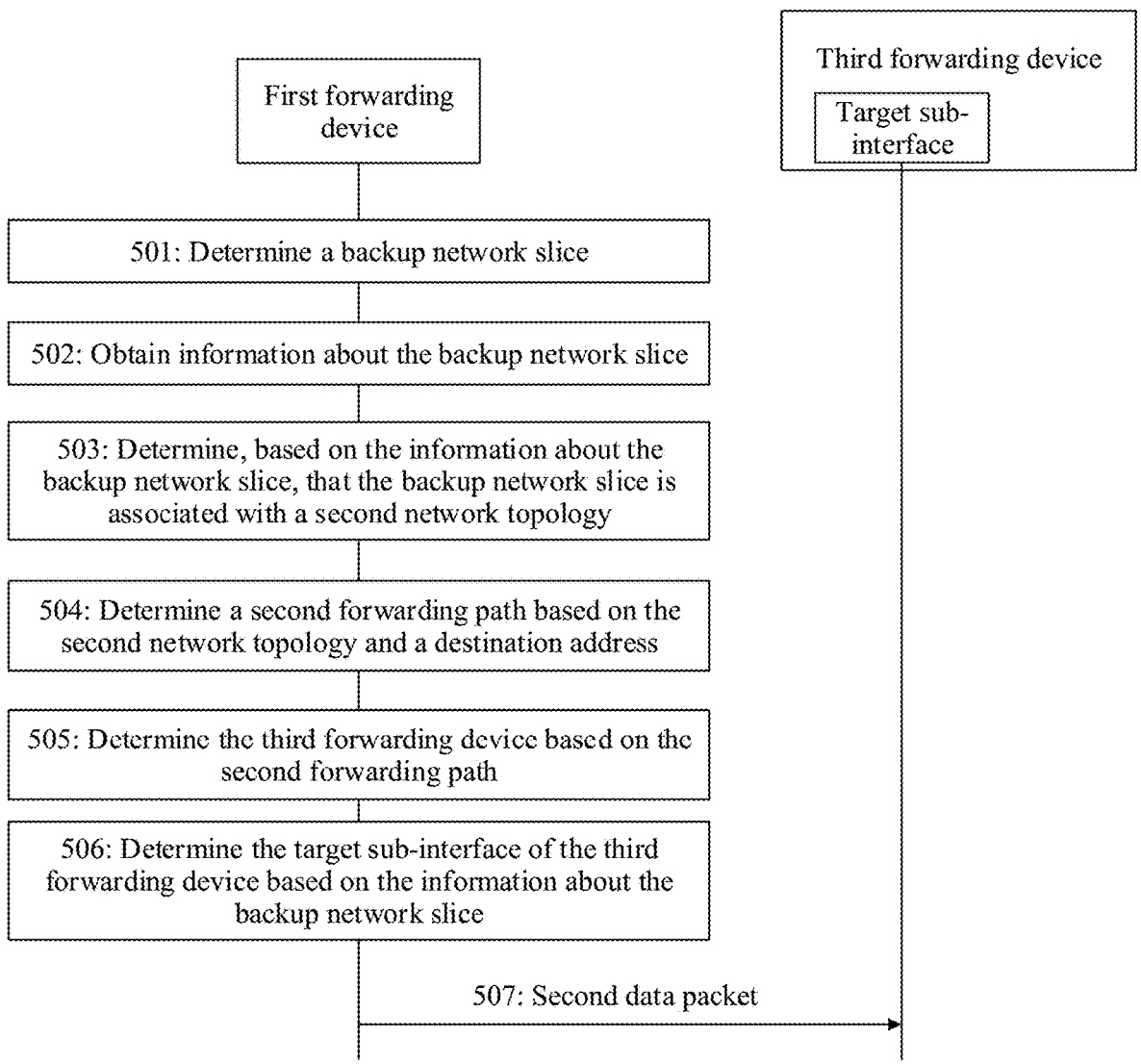
FIG. 5A is a schematic diagram of another embodiment of a data processing method according to an embodiment.

Referring to FIG. 5A, when the first forwarding device determines, based on the information about the second network slice, that the first forwarding path cannot be used to forward a data packet, the first forwarding device may determine to use a backup network slice to replace the second network slice, so as to forward a data packet. In FIG. 5A, the first forwarding device determines a backup network slice corresponding to the second network slice, and the backup network slice is a network slice that is set by the controller to replace the second network slice. Then, the first forwarding device determines a corresponding second network topology based on information about the backup network slice, and then calculates a second forwarding path based on the second network topology and the destination address, so as to forward the second data packet. Another embodiment of a data processing method includes the following steps.

501: The first forwarding device determines the backup network slice.

Figure 5B:
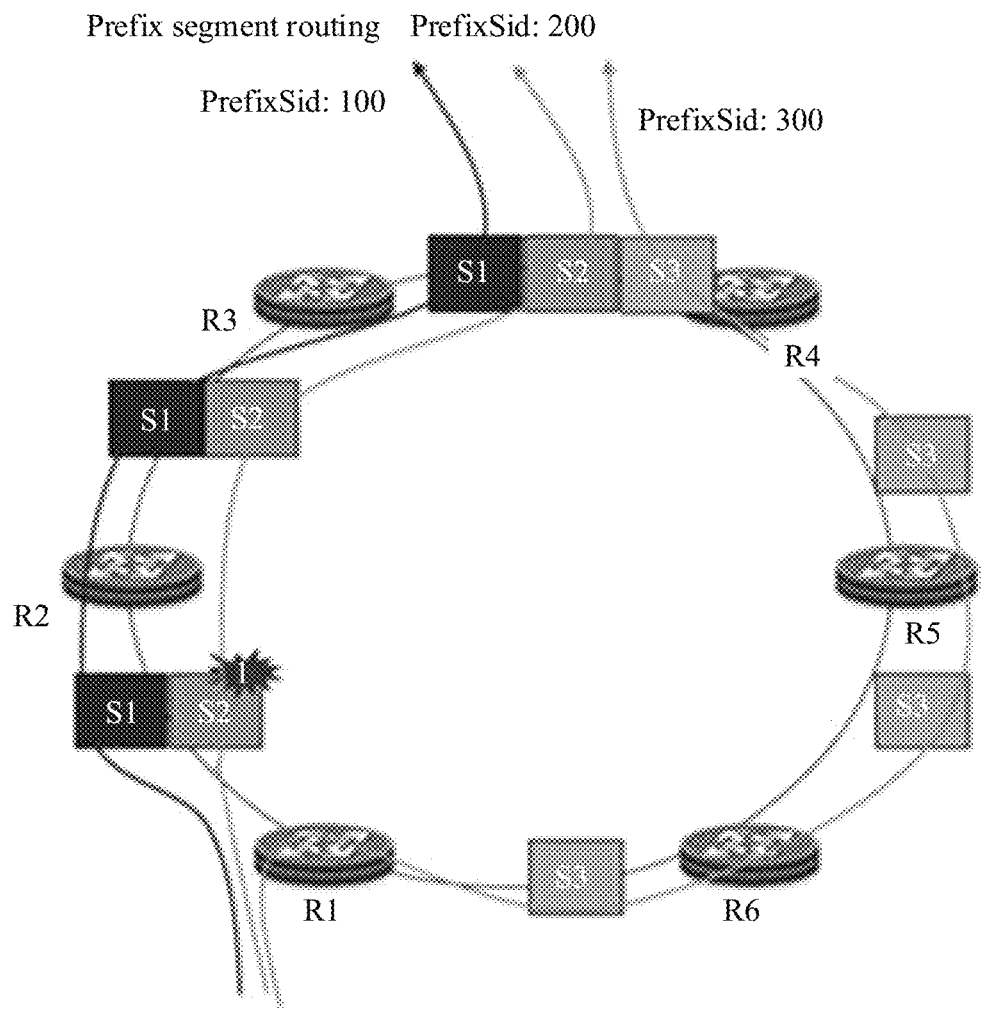
FIG. 5B is another schematic structural diagram of a network topology associated with a network slice according to an embodiment.

The controller may reserve the backup network slice for a network slice. A specific process may be as follows: An operator plans the backup network slice for the second network slice, and sends a request message to the controller to request to create the backup network slice. Then, the controller creates the backup network slice based on the request message. Specifically, the controller associates the backup network slice with a resource object at each layer in the network slice architecture, and then the controller delivers the information about the backup network slice to the first forwarding device. The first forwarding device may determine, based on the information about the second network slice, the backup network slice corresponding to the second network slice. The information about the second network slice carries an identifier of the backup network slice corresponding to the second network slice. The first forwarding device may determine, by using the identifier of the backup network slice, the backup network slice corresponding to the second network slice. The backup network slice is a network slice that is set by the controller to replace the second network slice. As shown in FIG. 5B, a network slice S3 is a backup slice of a network slice S2.

502: The first forwarding device obtains the information about the backup network slice.

The first forwarding device may receive the information about the backup network slice that is sent by the controller. The information about the backup network slice includes a resource object that is at each layer in the network slice architecture and that is associated with the backup network slice, which may be understood as a mapping relationship between the backup network slice and the resource object at each layer in the network slice architecture.

It should be noted that the information about the backup network slice that is obtained by the first forwarding device may be delivered by the controller to the first forwarding device in advance, or may be delivered by the controller to the first forwarding device when the first forwarding path determined by the first forwarding device based on the information about the second network slice cannot be used to forward a data packet. This is not specifically limited in this disclosure.

503: The first forwarding device determines, based on the information about the backup network slice, that the backup network slice is associated with the second network topology.

The first forwarding device may determine, based on the information about the backup network slice, that the backup network slice is associated with the second network topology at the network layer. As shown in FIG. 5B, the second network topology determined by the first forwarding device includes forwarding devices R1, R6, R5, R4, and R3.

504: The first forwarding device determines the second forwarding path based on the second network topology and the destination address.

The first forwarding device may determine the second forwarding path based on the second network topology and the destination address. As shown in FIG. 5B, the second forwarding path obtained by the first forwarding device through calculation is R1-R6-R5-R4-R3.

505: The first forwarding device determines a third forwarding device based on the second forwarding path.

506: The first forwarding device determines a target sub-interface of the third forwarding device based on the information about the backup network slice.

507: The first forwarding device sends the second data packet to the target sub-interface of the third forwarding device.

Step 505 to step 507 are similar to step 403 and step 405 in FIG. 4A, and details are not described herein again.

It should be noted that, to reduce use costs of a user, the controller may alternatively create a public network slice. A specific process may be as follows: An operator plans the public network slice on a network side, and the public network slice is used to replace a plurality of network slices. Then, an operator-side device sends a request message to the controller to request the controller to create the public network slice. In this case, the controller may create the public network slice based on the request message, associate the public network slice with a resource object at each layer in the network slice architecture, and then deliver information about the public network slice to the first forwarding device. When the first forwarding device determines, based on the information about the second network slice, that the first forwarding path cannot be used to forward a data packet, the first forwarding device may determine the public network slice based on the information about the second network slice, and then calculate the second forwarding path based on the second network topology associated with the public network slice, so as to forward the second data packet.

In this embodiment, the first forwarding device determines the backup network slice corresponding to the second network slice. Subsequently, the first forwarding device obtains the information about the backup network slice, determines, based on the information about the backup network slice, that the backup network slice is associated with the second network topology, calculates the second forwarding path based on the second network topology and the destination address, determines the third forwarding device based on the second forwarding path, and then determines the target sub-interface of the third forwarding device based on the information about the backup network slice. Finally, the first forwarding device forwards the second data packet to the target sub-interface of the third forwarding device. In this way, when the first link is faulty, the first forwarding device may recalculate a forwarding path for the second data packet, and correspondingly forward the second data packet, thereby improving completeness and practicability of the solution.

The network slice 1 is used as an example for description below with reference to FIG. 2B. First, resource objects that are at the layers in the network slice architecture and that are associated with the network slice 1 include the management resource 1, the system resource 1, the VPN 1, the protocol 1, the network topology 1, and the forwarding resource 1. First, at the management layer, the network slice 1 is associated with the management resource 1, the management resource 1 may be understood as the management object 1, and the network slice 1 is associated with a first management address. Details are shown in FIG. 2D. In this case, the user equipment 1 may access running data and management data of the network slice 1 in the management object 1 by using the first management address. The management resource 1 may include a management protocol, a management language, and the like. The management protocol may be NETCONF, and the management language may be YANG. The data of the network slice 1 is managed by using the corresponding management protocol and management language.

It should be noted that, in a possible implementation, resource objects that are at the layers in the network slice architecture and that are also associated with another network slice include the management resource 1, the system resource 1, the VPN 1, the protocol 1, the network topology 1, and the forwarding resource 1. To be specific, running data and management data of the another network slice associated with the management object 1 may also be accessed by using the first management address, and the running data and the management data of the network slice 1 may also be accessed. In other words, all network slices using the first management object can share data, in other words, these network slices are associated with a same management address. In this case, the data of these network slices may be accessed by accessing the first management address, so as to implement data sharing. For example, resource objects in the network slice architecture that are associated with the network slice 2 include the management resource 2, the system resource 1, the VPN 2, the protocol 2, the network topology 2, and the forwarding resource 2, and the network slice 2 is associated with the management object 2 shown in FIG. 2D. In this case, mutual access between data of the network slice 1 and data of the network slice 2 cannot be performed, so that isolation is implemented. Therefore, management objects associated with network slices are different, so that data isolation is implemented.

At the control resource layer, the network slice 1 manages the system resource 1 at the control resource layer. The system resource 1 may include a port, a CPU, a memory, and the like of a forwarding device. For example, the system resource 1 is a node through which the controller is directly connected to the user network 1. In other words, the VS 1 is created on the forwarding device A shown in FIG. 2B. In this case, both a private network route of the user network and a protocol running the private network route may be run on the VS 1. To be specific, the user equipment 1 may independently learn the private network route and the routing protocol by using the VS 1. If the user equipment 1 performs private network routing through the protocol 1, the controller may create a protocol in the VS 1, and also run the protocol 1 on an interface connected to the user network 1, so as to implement system resource isolation at the control resource layer. Corresponding system resources may be divided according to a specific network slice requirement, so as to support private network routing and private network route learning on a side of the user network 1. In addition, the network slice 1 is associated with the system resource 1 at the control resource layer. In other words, the network slice 1 and the network slice 2 share a same system resource, to perform route learning and the like by using the system resource 1, thereby implementing resource object sharing at the control resource layer.

At the service layer, the network slice 1 is associated with the VPN 1. An example in which the user equipment 1 transmits a data packet by using the VPN 1 is used below for description. As shown in FIG. 2B, the forwarding device A and a customer edge CE 2 may communicate with each other by using the VPN 1. In addition, it is assumed that a third data packet needs to be transmitted by using the VPN 1, and a destination address is an address of the CE 2. In this case, a private network route from the forwarding device A to the CE 2 may be iterated on a tunnel of the network slice 1 based on the network slice 1, in other words, a forwarding path A-C-D-K of forwarding devices is iterated. In addition, the VPN 1 is used for private network routing, so that a relationship between a network slice service and a network slice tunnel is established. If another network slice is also associated with the VPN 1, the network slice 1 and the another network slice share a resource object at the service layer. Moreover, if the network slice 2 is associated with the VPN 2, a forwarding device may forward a corresponding data packet by using the VPN 2, and the network slice 1 and the network slice 2 are associated with different resource objects at the service layer, so as to support different network slice services, thereby implementing resource isolation at the service layer.

At the protocol layer, the network slice 1 is associated with the protocol 1. As shown in FIG. 2B, if the user equipment 1 needs to transmit a data packet from the forwarding device A to the forwarding device L, an edge node CE 1 of the user network 1 needs to perform route learning on a path from the forwarding device A to the forwarding device L, in other words, to learn a protocol route of the user network 1. In this case, the protocol 1 is used. After performing route learning, the CE 1 sends route information to an edge node on a side of the forwarding device L, and then the edge node on the side of the forwarding device L also performs route learning based on the route information, so as to establish a path from the forwarding device A to the forwarding device L to forward a data packet. In addition, if the network slice 2 is associated with the protocol 2 at the protocol layer, the CE 2 in the user network 2 may perform route learning through the protocol 2. In this embodiment, network slices may share a resource object at the protocol layer. Moreover, different network slices may use different protocols to implement resource isolation at the protocol layer, thereby improving diversity and practicability of the solution.

At the network layer, the network slice 1 is associated with the network topology 1. As shown in FIG. 2B, the network topology 1 includes the forwarding devices A, B, C, D, E, F, and L. It should be noted that, if another network slice and the network slice 1 are associated with the network topology 1, a forwarding path may be reused during packet forwarding, thereby reducing an amount of route calculation for packet forwarding. For a specific implementation process, refer to the foregoing embodiment shown in FIG. 3. Details are not described herein again.

At the forwarding resource layer, the network slice 1 is associated with the forwarding resource 1. When a data packet is forwarded in the network topology 1 in the network slice 1, the forwarding resource 1 is used for forwarding. In this case, if another network slice also uses the forwarding resource 1, the forwarding resource 1 may be shared. As shown in FIG. 2B, the network slice 2 is associated with the forwarding resource 2, so that the forwarding resources of the network slice 1 and the network slice 2 can be isolated. In other words, in the technical solution, forwarding resources may be shared or isolated.

Figure 6:
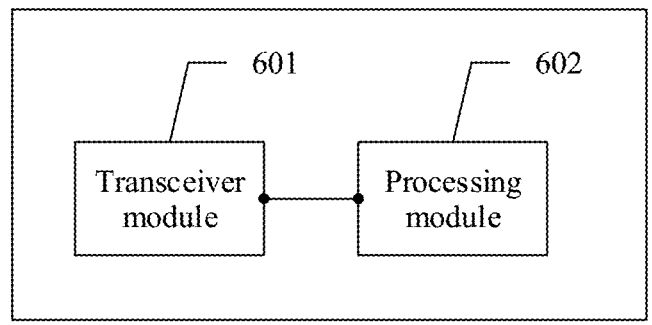
FIG. 6 is a schematic structural diagram of a controller according to an embodiment.

FIG. 6 is a possible schematic structural diagram of the controller in the foregoing embodiment. The controller may implement functions of the controller in the embodiment shown in FIG. 2A. Referring to FIG. 6, the controller includes a transceiver module 601 and a processing module 602. These units may perform corresponding functions of the controller in the foregoing method embodiment. The transceiver module 601 is configured to support the controller in performing steps 201 and 203 in FIG. 2A. The processing module 602 is configured to support the controller in performing step 202 in FIG. 2A, and/or perform another process performed by the controller in the technology described in this specification. For example, the transceiver module 601 is configured to perform the operation that the controller receives the request messages sent by the client device in the foregoing method embodiment. The processing module 602 is configured to perform the operation that the controller creates the at least two network slices based on the network slice request message in the foregoing method embodiment. For a specific execution process, refer to the detailed descriptions of corresponding steps in the embodiment shown in FIG. 2A and FIG. 2B. Details are not described herein again.

Figure 7:
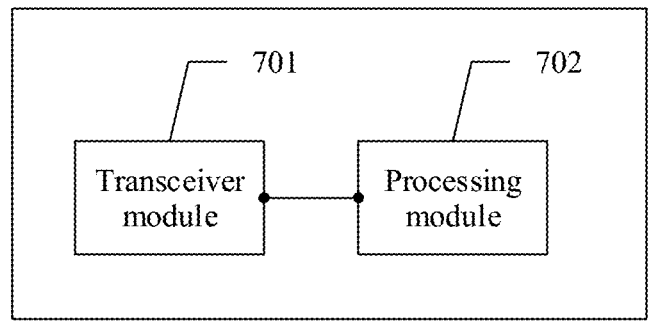
FIG. 7 is a schematic structural diagram of a forwarding device according to an embodiment.

FIG. 7 is a possible schematic structural diagram of the forwarding device in the foregoing embodiment. The forwarding device may implement functions of the forwarding device in the embodiment shown in FIG. 3B, FIG. 4A, or FIG. 5A. Referring to FIG. 7, the forwarding device includes a transceiver module 701 and a processing module 702. These units may perform corresponding functions of the forwarding device in the foregoing method embodiment. The transceiver module 701 is configured to support steps 301, 302, 307, and 308 in FIG. 3B, step 405 in FIG. 4A, and steps 502 and 507 in FIG. 5A. The processing module 702 is configured to support steps 303, 304, 305, and 306 in FIG. 3B, steps 401, 402, 403, and 404 in FIG. 4A, and steps 501, 503, 504, 505, and 506 in FIG. 5A, and/or perform another process performed by the forwarding device in the technology described in this specification. For example, the transceiver module 701 is configured to obtain a first data packet and a second data packet. The processing module 702 is configured to determine, based on information about a first network slice and information about a second network slice, that the first network slice and the second network slice are associated with a first topology. For a specific execution process, refer to the detailed descriptions of corresponding steps in the embodiment shown in FIG. 3B, FIG. 4A, or FIG. 5A. Details are not described herein again.

Figure 8:
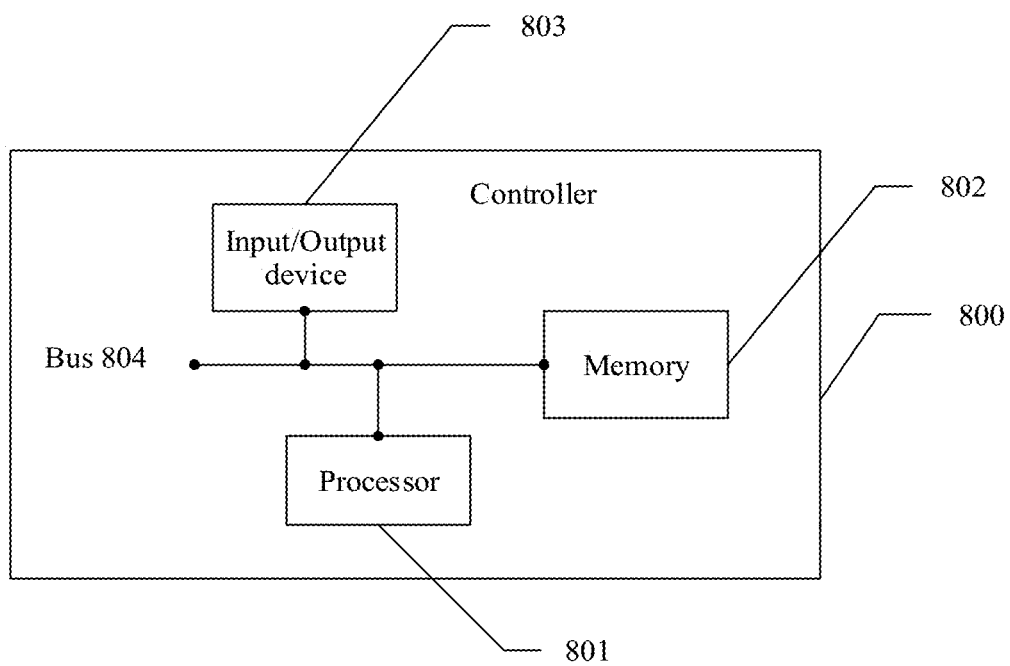
FIG. 8 is another schematic structural diagram of a controller according to an embodiment.

FIG. 8 is a possible schematic structural diagram of the controller in the foregoing embodiment. Referring to FIG. 8, the controller 800 includes a processor 801, a memory 802, an input/output device 803, and a bus 804. The processor 801, the input/output device 803, and the memory 802 are connected to each other by using the bus 804. The bus 804 may be a Peripheral Component Interconnect (PCI) bus, an Extended Industry Standard Architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus. The controller may implement functions of the controller in the embodiment shown in FIG. 2A. The processor 801 and the input/output device 803 may perform corresponding functions of the controller in the foregoing method example. The input/output device 803 supports the controller in performing steps 201 and 203 in FIG. 2A. The processor 801 is configured to support the controller in performing step 202 in FIG. 2A, and/or perform another process performed by the controller 800 in the technology described in this specification. The memory 802 is configured to store program code and data of the controller. For a specific execution process, refer to the detailed descriptions of corresponding steps in the embodiment shown in FIG. 2A. Details are not described herein again.

Figure 9:
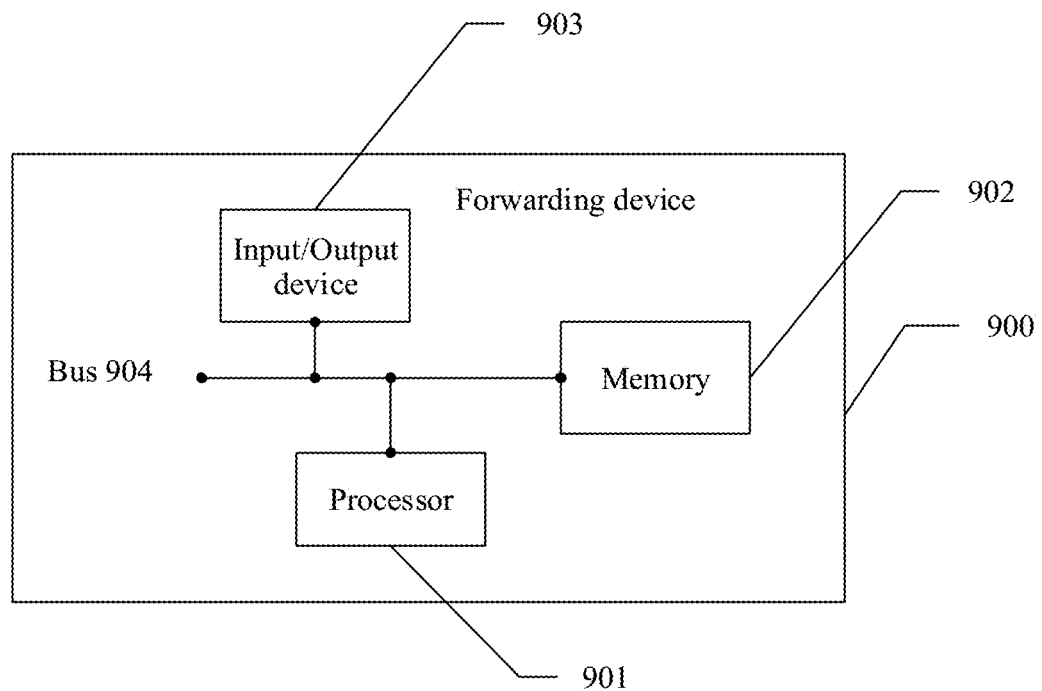
FIG. 9 is another schematic structural diagram of a forwarding device according to an embodiment.

FIG. 9 is a possible schematic structural diagram of the forwarding device in the foregoing embodiment. Referring to FIG. 9, the forwarding device 900 includes a processor 901, a memory 902, an input/output device 903, and a bus 904. The processor 901, the input/output device 903, and the memory 902 are connected to each other by using the bus 904. The bus 904 may be a PCI bus, an EISA bus, or the like. The bus 904 may be classified into an address bus, a data bus, a control bus, and the like. For ease of representation, only one thick line is used to represent the bus in FIG. 9, but this does not mean that there is only one bus or only one type of bus. The forwarding device 900 may implement functions of the forwarding device in the embodiment shown in FIG. 3B, FIG. 4A, or FIG. 5A. The processor 901 and the input/output device 903 may perform corresponding functions of the forwarding device in the foregoing method example. The processor 901 is configured to support steps 303, 304, 305, and 306 in FIG. 3B, steps 401, 402, 403, and 404 in FIG. 4A, and steps 501, 503, 504, 505, and 506 in FIG. 5A. The input/output device 903 is configured to support steps 301, 302, 307, and 308 in FIG. 3B, step 405 in FIG. 4A, and steps 502 and 507 in FIG. 5A, and/or perform another process performed by the forwarding device 900 in the technology described in this specification. The memory 902 is configured to store program code and data of a controller. For a specific execution process, refer to the detailed descriptions of corresponding steps in the embodiment shown in FIG. 3B, FIG. 4A, or FIG. 5A. Details are not described herein again.

Figure 10:
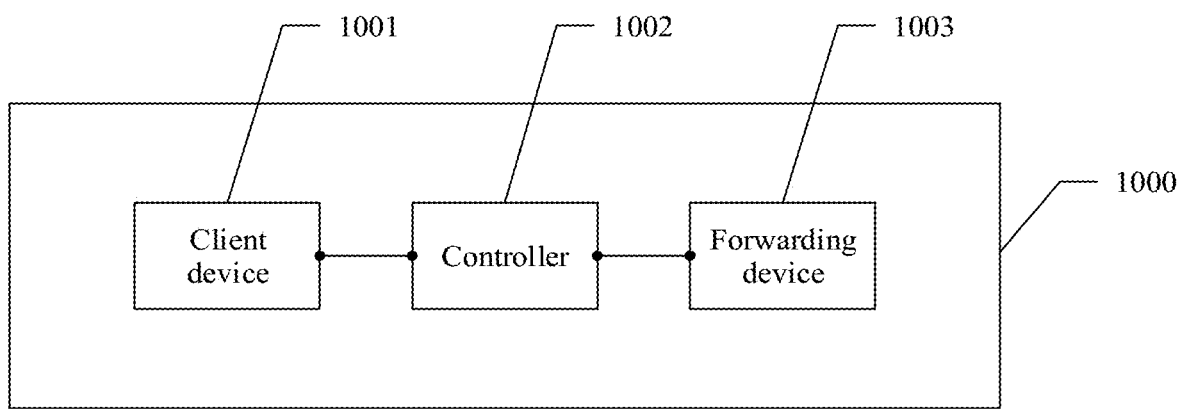
FIG. 10 is a schematic diagram of a data processing system according to an embodiment.

Referring to FIG. 10, an embodiment provides a data processing system 1000. The system 1000 is configured to implement the data processing method in the foregoing method embodiment. The system 1000 includes a client device 1001, a controller 1002, and a forwarding device 1003. The controller 1002 and the forwarding device 1003 may respectively implement functions of the controller and the forwarding device in the embodiment shown in FIG. 2A. In addition, the forwarding device 1003 may further implement functions of the forwarding device in the embodiments shown in FIG. 3B, FIG. 4A, and FIG. 5A. For example, the controller 1002 performs steps 201, 202, and 203 in FIG. 2A, and/or performs another process performed by the controller 1002 in the technology described in this specification. The forwarding device 1003 performs step 203 in FIG. 2A, steps 301, 302, 303, 304, 305, 306, 307, and 308 in FIG. 3B, steps 401, 402, 403, 404, and 405 in FIG. 4A, and steps 501, 502, 503, 504, 505, 506, and 507 in FIG. 5A, and/or performs another process performed by the forwarding device 1003 in the technology described in this specification.

It can be clearly understood by persons skilled in the art that, for convenient and brief description, for a detailed working process of the foregoing system, apparatus, and unit, refer to a corresponding process in the foregoing method embodiments. Details are not described herein again.

In another possible design, when the controller or the forwarding device is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the data processing method in the first aspect or the second aspect. Optionally, the storage unit is a storage unit in the chip, for example, a register or a buffer; or the storage unit may be a storage unit in the terminal but outside the chip, for example, a read-only memory (ROM), another type of static storage device that can store static information and an instruction, or a random-access memory RAM).

The processor mentioned above may be a CPU, a microprocessor, an application-specific integrated circuit (ASIC), or one or more integrated circuits configured to control program execution of the data processing method in the first aspect.

All or some of the foregoing embodiments may be implemented by software, hardware, firmware, or any combination thereof. When the software is used to implement the embodiments, the embodiments may be implemented all or partially in a form of a computer program product.

The computer program product includes one or more computer instructions. When the computer program instructions are loaded and executed on a computer, the procedure or functions based on the embodiments are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive (SSD)), or the like.

In the several embodiments provided, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions may be implemented in a form of a software product. The computer software product is stored in a storage medium and includes several instructions for enabling a computer device (which may be a personal computer, a server, a network device, or the like) to perform all or some of the steps of the method described in the embodiments. The foregoing storage medium includes any medium that can store program code, such as a USB flash drive, a removable hard disk, a ROM, a RAM, a magnetic disk, or a compact disc.

The foregoing embodiments are merely intended to describe the technical solutions, but are not intended to limit this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method comprising:
obtaining, from client devices, request messages requesting network slice creation;
creating, in response to the request messages, network slices comprising a first network slice and a second network slice that share a resource object at each of one or more layers in a network slice architecture, wherein the network slice architecture comprises a management layer, a control resource layer, a service layer, a protocol layer, a network layer, and/or a forwarding resource layer; and
sending, to one or more target forwarding devices, first information about the first network slice and second information about the second network slice,
wherein the first information indicates a first resource object that is at each of the one or more layers and that is associated with the first network slice,
wherein the second information indicates a second resource object that is at each of the one or more layers and that is associated with the second network slice, and
wherein the first resource object is the same as the second resource object.

2. The method of claim 1, wherein the network slice architecture comprises the protocol layer, wherein the request messages comprise a first request message from a first client device and a second request message from a second client device, wherein the first request message comprises first protocol requirement information of a first service carried by the first network slice, wherein the second request message comprises second protocol requirement information of a second service carried by the second network slice, and wherein creating the network slices comprises:
associating the first network slice with a first protocol at the protocol layer based on the first protocol requirement information; and
associating the second network slice with a second protocol at the protocol layer based on the second protocol requirement information.

3. The method of claim 2, wherein the network slice architecture further comprises the network layer, wherein the first request message further comprises first network access point information about a first network access point accessed by the first client device, wherein the second request message further comprises second network access point information about a second network access point accessed by the second client device, wherein creating the network slices further comprises:
associating the first network slice with a first network topology at the network layer based on the first network access point information; and
associating the second network slice with a second network topology at the network layer based on the second network access point information.

4. The method of claim 3, wherein associating the first network slice comprises:
using location information of the first network access point as a path parameter; and
calculating, based on the path parameter and a preset algorithm, the first network topology.

5. The method of claim 2, wherein the network slice architecture further comprises the forwarding resource layer, wherein the first request message further comprises first quality of service requirement information corresponding to the first service, wherein the second request message further comprises second quality of service requirement information corresponding to the second service, and wherein creating the network slices comprises:
allocating a first forwarding resource object at the forwarding resource category layer to the first network slice based on the first quality of service requirement information, wherein the first forwarding resource object comprises a sub-interface or traffic of a forwarding device; and allocating a second forwarding resource object at the forwarding resource layer to the second network slice based on the second quality of service requirement information.

6. The method of claim 5, wherein the first quality of service requirement information comprises latency information and bandwidth requirement information of the first service, and wherein allocating the first forwarding resource object comprises:
calculating the first forwarding resource object based on the latency information, the bandwidth requirement information, and a preset algorithm; and
associating the first network slice with the first forwarding resource object at the forwarding resource layer.

7. The method of claim 2, wherein the network slice architecture further comprises the management layer, wherein the first request message further comprises first management requirement information corresponding to the first network slice, wherein the second request message further comprises second management requirement information corresponding to the second network slice, and wherein creating the network slices comprises:
associating the first network slice with a first management resource at the management layer based on the first management requirement information, wherein the first management resource is associated with a first management address, wherein the first management address is for the first client device to access first running data and first management data of the first network slice in the first management resource, and wherein the first management resource comprises a management protocol or a management language; and
associating the second network slice with the first management resource, wherein the first management address is further for the second client device to access second running data and second management data of the second network slice.

8. The method of claim 2, wherein the network slice architecture further comprises the management layer, wherein the first request message further comprises first management requirement information corresponding to the first network slice, wherein the second request message further comprises second management requirement information corresponding to the second network slice, and wherein creating the network slices comprises:
associating the first network slice with a first management resource at the management layer based on the first management requirement information, wherein the first management resource is associated with a first management address, wherein the first management address is for the first client device to access first running data and first management data of the first network slice, and wherein the first management address comprises a management protocol or a management language; and
associating the second network slice with a second management resource at the management layer based on the second management requirement information, wherein the second management resource is associated with a second management address, and wherein the second management address is for the second client device to access second running data and second management data of the second network slice.

9. The method of claim 7, wherein the first management requirement information carries a management identifier indicating a requirement of the first client device for managing data of the first network slice at each of the one or more layers, and wherein associating the first network slice comprises determining, based on the management identifier, that the first network slice corresponds to the first management resource at the management layer.

10. The method of claim 2, wherein the network slice architecture further comprises the control resource layer, wherein the first request message further comprises first routing requirement information, wherein the second request message further comprises second routing requirement information, and wherein creating the network slices comprises:
associating the first network slice with a first system resource at the control resource layer based on the first routing requirement information, wherein the first system resource comprises a port, a central processing unit (CPU), or a memory of a forwarding device; and
associating the second network slice with a second system resource at the control resource layer based on the second routing requirement information.

11. The method of claim 10, wherein the first routing requirement information comprises a quantity of routes of a private network in which the first client device is located, and wherein associating the first network slice comprises determining, based on the quantity, to allocate the first system resource to the first network slice.

12. The method of claim 2, wherein the network slice architecture further comprises the service layer, wherein the first request message further carries first tenant information, wherein the second request message further carries second tenant information, and wherein creating the network slices comprises:
associating the first network slice with a first virtual private network (VPN) at the service layer based on the first tenant information; and
associating the second network slice with a second VPN at the service layer based on the second tenant information.

13. The method of claim 12, wherein the first tenant information comprises location information of a first tenant, and wherein associating the first network slice comprises:
determining a target edge node device based on the location information; and
determining, based on the target edge node device, that the first network slice corresponds to the first VPN.

14. A method implemented by a first forwarding device and comprising:
obtaining a first data packet associated with a first network slice and a second data packet associated with a second network slice, wherein the first network slice and the second network slice share a resource object at each of one or more categories layers in a network slice architecture, and wherein the network slice architecture comprises a management layer, a control resource layer, a service layer, a protocol layer, a network layer, and/or a forwarding resource layer;
obtaining first information about the first network slice and second information about the second network slice, wherein the first information indicates a first resource object that is at each of the one or more layers and that is associated with the first network slice, wherein the second information indicates a second resource object that is at each of the one or more layers and that is associated with the second network slice, and wherein the first resource object is the same as the second resource object;
determining, based on the first information, a first resource for forwarding the first data packet; and determining, based on the second information, a second resource for forwarding the second data packet.

15. The method of claim 14, wherein the network slice architecture comprises the network layer and the forwarding resource layer, wherein the first data packet and the second data packet have a same destination address, wherein determining the first resource and determining the second resource comprises:
determining, based on a first network resource object that is at the network layer and that is associated with the first network slice, that the first network slice is associated with a first network topology;
determining, based on a second network resource object that is at the network layer and that is associated with the second network slice, that the second network slice is associated with the first network topology;
determining, based on a first forwarding resource object that is at the forwarding resource layer and that is associated with the first network slice, that the first network slice is associated with a first forwarding resource;
determining, based on a second forwarding resource object that is at the forwarding resource layer and that is associated with the second network slice, that the second network slice is associated with a second forwarding resource, and
wherein the method further comprises:
forwarding the first data packet based on the first network topology and the first forwarding resource; and
forwarding the second data packet based on the first network topology and the second forwarding resource.

16. The method of claim 15, wherein forwarding the first data packet comprises:
calculating a first forwarding path based on the first network topology and the destination address;
determining, based on the first forwarding path, a second forwarding device on the first forwarding path;
forwarding the first data packet to the second forwarding device, and
wherein forwarding the second data packet based on the first network topology and the second forwarding resource comprises:
calculating the first forwarding path based on the first network topology and the destination address;
determining, based on the first forwarding path, the second forwarding device on the first forwarding path; and
forwarding the second data packet to the second forwarding device.

17. The method of claim 16, wherein the first forwarding resource comprises a first sub-interface of the second forwarding device, wherein the second forwarding resource comprises a second sub-interface of the second forwarding device, wherein forwarding the first data packet comprises forwarding the first data packet to the first sub-interface, and wherein forwarding the second data packet comprises forwarding the second data packet to the second sub-interface.

18. The method of claim 17, wherein when a first link that is between a current sub-interface of the first forwarding device and the second sub-interface and through which the second data packet passes is faulty, the method further comprises:
obtaining a second network topology by excluding the first link from the first network topology;
calculating a second forwarding path of the second data packet based on the second network topology and the destination address; and
forwarding the second data packet based on the second forwarding path.

19. The method of claim 17, wherein when a first link that is between a current sub-interface of the first forwarding device and the second sub-interface and through which the second data packet passes is faulty, the method further comprises:
determining a backup network slice for replacing the second network slice or a public network slice for replacing a plurality of network slices comprising the second network slice;
obtaining backup network slice information about the backup network slice or public network slice information about the public network slice;
determining, based on the backup network slice information, that the backup network slice is associated with a second network topology or determining, based on the public network slice information, that the public network slice is associated with the second network topology;
calculating a second forwarding path based on the second network topology and the destination address; and
forwarding the second data packet based on the second forwarding path.

20. The method of claim 14, wherein the network slice architecture comprises the management layer, and wherein the method further comprises:
determining that the first network slice is associated with a first management resource at the management layer, wherein the first management resource is associated with a first management address for a first client device to access first running data and first management data of the first network slice in the first management resource, and wherein the first management resource comprises a management protocol or a management language; and
determining that the second network slice is associated with the first management resource, wherein the first management address is for a second client device to access second running data and second management data of the second network slice in the first management resource.

21. The method of claim 14, wherein the network slice architecture comprises the control resource layer, and wherein the method further comprises:
determining that the first network slice is associated with a first control resource object at the control resource layer, wherein the first control resource object is a first system resource comprising a port, a central processing unit (CPU), or a memory of the first forwarding device;
determining that the second network slice is associated with the first control resource object; and
forwarding the first data packet and the second data packet using the first system resource.

22. The method of claim 14, wherein the network slice architecture comprises the service layer, and wherein the method further comprises:
determining that the first network slice is associated with a first virtual private network (VPN) at the service layer;
determining that the second network slice is associated with the first VPN; and
forwarding the first data packet and the second data packet through the first VPN.

23. The method of claim 14, wherein the network slice architecture comprises the protocol layer, and wherein the method further comprises:
- determining that the first network slice is associated with a first protocol at the protocol layer;
- determining that the second network slice is associated with the first protocol;
- performing route learning according to the first protocol; and
- forwarding the first data packet and the second data packet.

24. A first forwarding device comprising:
- a transceiver configured to:
  - obtain a first data packet associated with a first network slice and a second data packet associated with a second network slice, wherein the first network slice and the second network slice share a resource object at each of one or more layers in a network slice architecture, and wherein the network slice architecture comprises a management layer, a control resource layer, a service layer, a protocol layer, a network layer, and/or a forwarding resource layer; and
  - obtain first information about the first network slice and second information about the second network slice, wherein the first information indicates a first resource object that is at each of the one or more layers and that is associated with the first network slice, wherein the second information indicates a second resource object that is at each of the one or more layers and that is associated with the second network slice, and wherein the first resource object is the same as the second resource object; and
- a processor coupled to the transceiver and configured to:
  - determine, based on the first information, a first resource for forwarding the first data packet; and
  - determine, based on the second information, a second resource for forwarding the second data packet.

25. The first forwarding device of claim 24, wherein the network slice architecture comprises the network layer and the forwarding resource layer, wherein the first data packet and the second data packet have a same destination address, wherein the processor is configured to:
- determine, based on a first network resource object that is at the network layer and that is associated with the first network slice, that the first network slice is associated with a first network topology;
- determine, based on a second network resource object that is at the network layer and that is associated with the second network slice, that the second network slice is associated with the first network topology;
- determine, based on a first forwarding resource object that is at the forwarding resource layer and that is associated with the first network slice, that the first network slice is associated with a first forwarding resource; and
- determine, based on a second forwarding resource object that is at the forwarding resource layer and that is associated with the second network slice, that the second network slice is associated with a second forwarding resource, and wherein the transceiver is further configured to:
- forward the first data packet based on the first network topology and the first forwarding resource, and
- forward the second data packet based on the first network topology and the second forwarding resource.

26. The first forwarding device of claim 25, wherein the processor is configured to:
- calculate a first forwarding path based on the first network topology and the destination address;
- determine, based on the first forwarding path, a second forwarding device on the first forwarding path, and wherein the transceiver is further configured to:
- forward the first data packet to the second forwarding device; and
- forward the second data packet to the second forwarding device.

27. The first forwarding device of claim 26, wherein the first forwarding resource comprises a first sub-interface of the second forwarding device, wherein the second forwarding resource comprises a second sub-interface of the second forwarding device, and wherein the transceiver is configured to:
- forward the first data packet to the first sub-interface; and
- forward the second data packet to the second sub-interface.

28. The first forwarding device of claim 27, wherein when a first link that is between a current sub-interface of the first forwarding device and the second sub-interface and through which the second data packet passes is faulty, the processor is further configured to:
- obtain a second network topology by excluding the first link from the first network topology; and
- calculate a second forwarding path of the second data packet based on the second network topology and the destination address, and wherein the transceiver is further configured to forward the second data packet based on the second forwarding path.

29. The first forwarding device of claim 27, wherein when a first link that is between a current sub-interface of the first forwarding device and the second sub-interface and through which the second data packet passes is faulty, the processor is further configured to determine a backup network slice for replacing the second network slice or a public network slice for replacing a plurality of network slices, wherein the transceiver is further configured to obtain backup network slice information about the backup network slice or public network slice information about the public network slice, wherein the processor is further configured to:
- determine, based on the backup network slice information, that the backup network slice is associated with a second network topology or determine, based on the public network slice information, that the public network slice is associated with the second network topology; and
- calculate a second forwarding path based on the second network topology and the destination address, and wherein the transceiver is further configured to forward the second data packet based on the second forwarding path.

30. The first forwarding device of claim 24, wherein the network slice architecture comprises the management layer, and wherein the processor is further configured to:
- determine that the first network slice is associated with a first management resource at the management layer, wherein the first management resource is associated with a first management address for a first client device to access first running data and first management data of the first network slice in the first management resource, and wherein the first management resource comprises a management protocol or a management language; and determine that the second network slice is associated with the first management resource, wherein the first management address is for a second client device to access second running data and second management data of the second network slice in the first management resource.

31. The first forwarding device of claim 24, wherein the network slice architecture comprises the control resource layer, wherein the processor is further configured to:
determine that the first network slice is associated with a first control resource object at the control resource layer, wherein the first control resource object is a first system resource comprising a port, a central processing unit (CPU), or a memory of the first forwarding device; and
determine that the second network slice is associated with the first control resource object, and
wherein the transceiver is further configured to forward the first data packet and the second data packet using the first system resource.

32. The first forwarding device of claim 24, wherein the network slice architecture comprises the service layer, wherein the processor is further configured to:
determine that the first network slice is associated with a first virtual private network (VPN) at the service layer; and
determine that the second network slice is associated with the first VPN, and
wherein the transceiver is further configured to forward the first data packet and the second data packet through the first VPN.

33. The first forwarding device of claim 24, wherein the network slice architecture comprises the protocol layer, wherein the processor is further configured to:
determine that the first network slice is associated with a first protocol at the protocol layer;
determine that the second network slice is associated with the first protocol; and
perform route learning according to the first protocol, and
wherein the transceiver is further configured to forward the first data packet and the second data packet.

34. A data processing system comprising:
a controller configured to:
obtain, from client devices, request messages requesting network slice creation;
create, in response to the request messages, network slices comprising a first network slice and a second network slice that share a resource object at each of one or more layers in a network slice architecture, wherein the network slice architecture comprises a management layer, a control resource layer, a service layer, a protocol layer, a network layer, or a forwarding resource layer; and
send first information about the first network slice and second information about the second network slice, wherein the first information indicates a first resource object that is at each of the one or more categories layers and that is associated with the first network slice, wherein the second information indicates a second resource object that is at each of the one or more layers and that is associated with the second network slice, and wherein the first resource object is the same as the second resource object; and
a first forwarding device configured to:
obtain a first data packet associated with the first network slice and a second data packet associated with the second network slice;
receive the first information and the second information from the controller;
determine, based on the first information, a first resource for forwarding the first data packet; and
determine, based on the second information, a second resource for forwarding the second data packet.

\* \* \* \* \*

UNITED STATES PATENT AND TRADEMARK OFFICE
CERTIFICATE OF CORRECTION

PATENT NO. : 12,143,927 B2  
APPLICATION NO. : 17/334127  
DATED : November 12, 2024  
INVENTOR(S) : Zhibo Hu and Junda Yao Page 1 of 1

It is certified that error appears in the above-identified patent and that said Letters Patent is hereby corrected as shown below:

In the Claims

Claim 5, Column 36, Line 63: "resource category layer to" should read "resource layer to"

Claim 14, Column 38, Line 51: "more categories layers in" should read "more layers in"

Claim 34, Column 44, Lines 20-21: "more categories layers and" should read "more layers and"

Signed and Sealed this  
Seventeenth Day of December, 2024

Derrick Brent  
*Acting Director of the United States Patent and Trademark Office*